(12) United States Patent
Park et al.

(10) Patent No.: US 10,819,160 B2
(45) Date of Patent: Oct. 27, 2020

(54) WIRELESS POWER TRANSMITTER

(71) Applicant: Samsung Electronics Co., Ltd., Suwon-si (KR)

(72) Inventors: Jae-Hyun Park, Yongin-si (KR); Chang-Yeong Kim, Seoul (KR); Young-Ho Ryu, Yongin-si (KR); Kyu-Sub Kwak, Seoul (KR); Dong-Zo Kim, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 518 days.

(21) Appl. No.: 15/061,313

(22) Filed: Mar. 4, 2016

(65) Prior Publication Data

US 2016/0261142 A1 Sep. 8, 2016

(30) Foreign Application Priority Data

Mar. 6, 2015 (KR) .......................... 10-2015-0031798

(51) Int. Cl.
*H02J 50/40* (2016.01)
*H02J 50/12* (2016.01)
*H01F 38/14* (2006.01)

(52) U.S. Cl.
CPC .............. *H02J 50/40* (2016.02); *H01F 38/14* (2013.01); *H02J 50/12* (2016.02)

(58) Field of Classification Search
CPC ............ H02J 50/40; H02J 50/12; H01F 38/14
See application file for complete search history.

(56) References Cited

U.S. PATENT DOCUMENTS

| | | | | |
|---|---|---|---|---|
| 6,297,736 | B1 * | 10/2001 | Lewis | G01V 3/08 324/326 |
| 7,076,206 | B2 * | 7/2006 | Elferich | H02J 7/025 455/41.1 |
| 8,076,801 | B2 * | 12/2011 | Karalis | H01Q 1/02 307/104 |
| 8,432,125 | B2 * | 4/2013 | Takada | B60L 11/182 320/104 |

(Continued)

FOREIGN PATENT DOCUMENTS

| | | |
|---|---|---|
| CN | 103208830 A | 7/2013 |
| CN | 103563204 A | 2/2014 |

(Continued)

OTHER PUBLICATIONS

Hyperphysics, "Magnetic flux," 2001, pp. 1.*

(Continued)

*Primary Examiner* — Pinping Sun
(74) *Attorney, Agent, or Firm* — Sughrue Mion, PLLC

(57) ABSTRACT

A wireless power transmitter for wirelessly transmitting power to a wireless power receiver is provided. A wireless power transmitter according to various embodiments may include: a driving unit that provides power; and a power transmission unit that wirelessly transmits power to the wireless power receiver based on the power received from the driving unit, wherein the power transmission unit may include at least one capacitor; a first coil connected to the at least one capacitor, and a second coil connected to the at least one capacitor and disposed parallel to the first coil.

14 Claims, 17 Drawing Sheets

(56) References Cited

U.S. PATENT DOCUMENTS

| | | | | |
|---|---|---|---|---|
| 8,446,045 B2* | 5/2013 | Smith | H02J 50/12 | 307/104 |
| 8,994,225 B2* | 3/2015 | Hong | H01Q 7/005 | 307/104 |
| 9,449,754 B2* | 9/2016 | Graham | H01F 27/2823 | |
| 9,685,802 B1* | 6/2017 | Mirov | H02J 7/0044 | |
| 2010/0187913 A1* | 7/2010 | Smith | H02J 5/005 | 307/104 |
| 2011/0127848 A1* | 6/2011 | Ryu | H02J 5/005 | 307/104 |
| 2011/0316334 A1 | 12/2011 | Shimokawa | | |
| 2012/0169278 A1* | 7/2012 | Choi | H04B 5/0037 | 320/108 |
| 2012/0228955 A1 | 9/2012 | Endo et al. | | |
| 2013/0043734 A1* | 2/2013 | Stone | H04B 5/0037 | 307/104 |
| 2013/0093252 A1* | 4/2013 | Norconk | H02J 5/005 | 307/104 |
| 2013/0143519 A1* | 6/2013 | Doezema | G08B 21/0446 | 455/404.2 |
| 2014/0035386 A1* | 2/2014 | Hatanaka | H04B 5/0037 | 307/104 |
| 2014/0049211 A1 | 2/2014 | Park et al. | | |
| 2014/0159656 A1* | 6/2014 | Riehl | H01F 38/14 | 320/108 |
| 2014/0197694 A1* | 7/2014 | Asanuma | H01F 38/14 | 307/104 |
| 2014/0339913 A1* | 11/2014 | Tsuji | H02J 5/005 | 307/104 |
| 2015/0016035 A1* | 1/2015 | Tussy | G06F 1/163 | 361/679.03 |
| 2015/0130407 A1* | 5/2015 | Ni | H01F 38/14 | 320/108 |
| 2015/0137612 A1* | 5/2015 | Yamakawa | H01F 38/14 | 307/104 |
| 2015/0188352 A1* | 7/2015 | Peek | H02J 7/0042 | 320/108 |
| 2015/0286246 A1* | 10/2015 | Matsumoto | G06F 1/163 | 345/173 |
| 2015/0311728 A1* | 10/2015 | Yun | H02J 5/005 | 307/104 |
| 2015/0364938 A1* | 12/2015 | Lapetina | H01F 27/365 | 320/114 |
| 2015/0372493 A1* | 12/2015 | Sankar | H02J 50/10 | 307/104 |
| 2016/0164303 A1* | 6/2016 | Ku | G01R 23/005 | 307/104 |
| 2016/0181858 A1* | 6/2016 | Satyamoorthy | H02J 7/0042 | 307/104 |
| 2016/0197511 A1* | 7/2016 | Atasoy | H02J 7/025 | 307/104 |
| 2016/0211696 A1* | 7/2016 | Park | H02J 7/0042 | |
| 2016/0261139 A1* | 9/2016 | Kidakarn | H02J 7/025 | |
| 2016/0322852 A1* | 11/2016 | Yeh | H04B 5/0037 | |
| 2017/0207425 A1* | 7/2017 | Chun | H01M 2/1022 | |
| 2017/0216508 A1* | 8/2017 | Zilbershlag | A61N 1/3787 | |
| 2017/0242406 A1* | 8/2017 | Green | H02J 7/0044 | |

FOREIGN PATENT DOCUMENTS

| | | | | |
|---|---|---|---|---|
| EP | 2357716 A | 8/2011 | | |
| EP | 2695277 A2 | 2/2014 | | |
| EP | 2808972 A1 | 12/2014 | | |
| KR | 20140011076 | 1/2014 | | |
| KR | 20140012359 | 2/2014 | | |
| WO | 2014-092405 A1 | 6/2014 | | |
| WO | WO 2014092405 A1 * | 6/2014 | | H02J 17/00 |
| WO | 2014-118615 A1 | 8/2014 | | |
| WO | WO2014/181227 | 11/2014 | | |

OTHER PUBLICATIONS

Collins English dictionary, "Electromotive Force," pp. 2-3.*

Lee, et. al., "Magnetic Resonant wireless power delivery for distributed sensor and wireless systems," 2012, IEEE Tropical conference on Wireless sensors and Sensor Networks, pp. 13-16 (Year: 2012).*

European Search Report dated Feb. 2, 2018 corresponding to European Patent Application No. 16761947.7.

Communication dated Sep. 27, 2019 issued by the State Intellectual Property Office of P.R. China in counterpart Chinese Application No. 201680013695.4.

* cited by examiner

WIRELESS POWER TRANSMITTER

RELATED APPLICATION(S)

This application claims the priority under 35 U.S.C. § 119(a) to Korean Application Serial No. 10-2015-0031798, which was filed in the Korean Intellectual Property Office on Mar. 6, 2015, the entire content of which is hereby incorporated by reference.

BACKGROUND

The present disclosure relates to a wireless power transmitter, and more particularly to a wireless power transmitter for wirelessly transmitting electrical power to a wireless power receiver.

Mobile terminals such as a mobile phone, a Personal Digital Assistant (PDA) and the like are driven with rechargeable batteries due to their nature, and the battery of the mobile terminal is supplied with electrical energy by using a separate charging apparatus in order to charge the battery. Typically, the charging device and the battery have separate contact terminals at an exterior thereof, respectively, and are electrically connected with each other by contacting the contact terminals.

However, in such a contact-type charging scheme, the contact terminals protrude outwardly, and thus are easily contaminated by foreign substances. As a result, battery charging is not correctly performed. Further, the battery charging may also not be correctly performed in a case where the contact terminal is exposed to moisture.

Recently, a wireless charging or a non-contact charging technology has been developed and used for various electronic devices to solve the above-mentioned problem.

Such a wireless charging technology employs wireless electrical power transmission/reception, and corresponds to, for example, a system in which a battery can be automatically charged when a portable phone is not connected to a separate charging apparatus, but merely placed on a charging pad. In general, the technology is known as a wireless electrical toothbrush or a cordless electrical shaver. The wireless charging technology can improve a waterproofing function because it can be used to wirelessly charge the electronic devices. The wireless charging technology can improve the portability of electronic devices because it does not require a wired charger. Therefore, it is expected that technologies related to the wireless charging technology will be significantly developed in the coming age of electrical cars.

The wireless charging technology largely includes an electromagnetic induction scheme using a coil, a resonance scheme using a resonance, and an RF/microwave radiation scheme converting electrical energy to a microwave and then transmitting the microwave.

A power transmission method through the electromagnetic induction corresponds to a scheme of transmitting electrical power between a first coil and a second coil. When a magnetic is moved in a coil, an induction current is generated. By using the induction current, a magnetic field is generated at a transmitting end, and electrical current is induced according to a change of the magnetic field so as to make energy at a reception end. The phenomenon is referred to as the magnetic induction, and the electrical power transmission method using magnetic induction has high energy transmission efficiency.

With respect to the resonance scheme, Professor Soljacic and a research team of Massachusetts Institute of Technology (MIT) announced a wireless charging system in which electrical power is wirelessly transmitted to an electronic device using an electrical power transmission principle of the resonance scheme based on a coupled mode theory even if the electronic device to be charged is separated from a charging device by several meters. The wireless charging system of the research team employs a concept in physics which says resonance is the tendency in which when a tuning fork vibrates at a particular frequency, a wine glass next to the tuning fork oscillates at the same frequency. The research team generates electromagnetic waves containing electrical energy resonating at a resonant frequency, instead of resonating sounds. The resonating electrical energy is directly transferred only when there is a device having a resonance frequency and having parts of electrical energy which are not used and instead are reabsorbed into an electromagnetic field. Since the electrical energy is reabsorbed into an electromagnetic field instead of spreading in the air, unlike other electromagnetic waves, the electrical energy does not affect surrounding devices or people.

SUMMARY

A wireless power transmitter may include a coil element to wirelessly transmit power. Meanwhile, the magnetic field generated from the coil element of the wireless power transmitter is mainly generated in a direction perpendicular to a cross section of the coil element. Meanwhile, the wireless power receiver may also include a coil element to wirelessly receive the power. When a coil element including the wireless power receiver is arranged to correspond to the coil element of the wireless power transmitter, a charging efficiency can be maximized. Thus, there is limitation on the placement position for charging the wireless power receiver.

Various embodiments of the present disclosure may provide a wireless power receiver for solving the above-described problem and other problems.

Various embodiments of the present disclosure are to provide a wireless power transmitter that wirelessly transmits power to a wireless power receiver. The wireless power transmitter may include: a driving unit that provides power; and a power transmission unit that wirelessly transmits power to the wireless power receiver based on the power received from the driving unit. The power transmission unit may include a capacitor, a first coil connected to the capacitor, and a second coil connected to the capacitor and disposed in parallel with the first coil.

Various embodiments of the present disclosure are to provide a wireless power transmitter that wirelessly transmits power to a wireless power receiver. The wireless power transmitter may include: a driving unit that provides power; and a power transmission unit that wirelessly transmits power to the wireless power receiver based on the power received from the driving unit. The power transmission unit may include a capacitor, and a coil that is connected to the capacitor and includes a first sub-coil, a second sub-coil that is parallel to the first sub-coil, and a connecting conductive wire that connects the first sub-coil to the second sub-coil.

According to various embodiments of the disclosure, a wireless power transmitter capable of radially generating a magnetic field can be provided. Thus, the limitation on the placement position for charging the wireless power receiver can be resolved.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
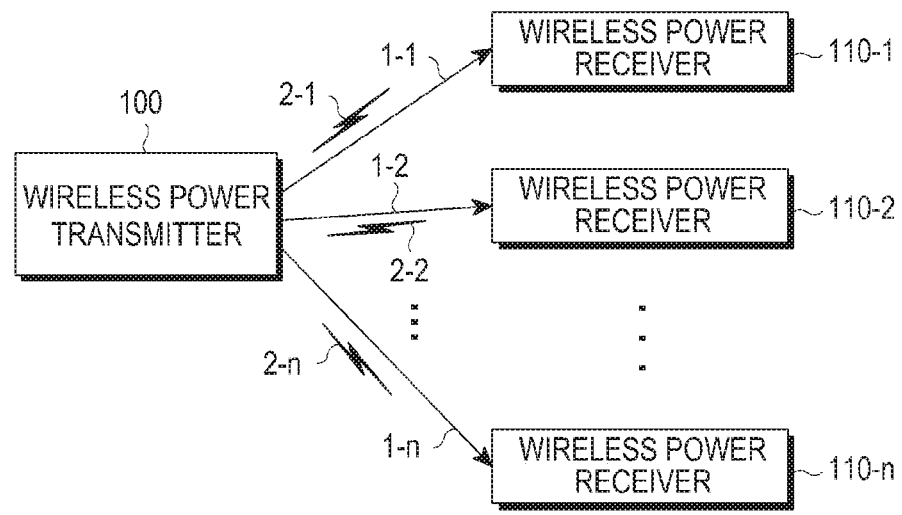
FIG. 1 illustrates a conceptual diagram for describing general operations of a wireless charging system.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

As used herein, the expression "A or B", "at least one of A and/or B", or "one or more of A and/or B" may include any or all possible combinations of items enumerated together. For example, the expression "A or B", "at least one of A and B", or "at least one of A or B" may include (1) at least one A, (2) at least one B, or (3) both at least one A and at least one B.

The expression "a first", "a second", "the first", or "the second" used in various embodiments of the present disclosure may modify various components regardless of the order and/or the importance but does not limit the corresponding components. The above expressions are used merely for the purpose of distinguishing an element from the other elements. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing particular embodiments and are not intended to limit the scope of other embodiments. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary are to be interpreted to have the meanings equal to the contextual meanings in the relevant field of the art, and are not to be interpreted to have ideal or excessively formal meanings unless clearly defined in the present disclosure. In some cases, even the term defined in the present disclosure should not be interpreted to exclude embodiments of the present disclosure.

A wireless power receiver according to various embodiments of the present disclosure may be included in various kinds of electronic devices. For example, the electronic device may include at least one of a smartphone, a tablet personal computer (PC), a mobile phone, a video phone, an electronic book (e-book) reader, a desktop PC, a laptop PC, a netbook computer, a personal digital assistant (PDA), a portable multimedia player (PMP), an MP3 player, a mobile medical appliance, a camera, and a wearable device (e.g., a head-mounted-device (HMD) such as electronic glasses, electronic clothes, an electronic bracelet, an electronic necklace, an electronic appcessory, electronic tattoos, or a smart watch).

At first, with reference to FIG. 1, a concept of a wireless charging system which can be applied to an embodiment of the present disclosure is described.

FIG. 1 illustrates a conceptual diagram of describing general operations of a wireless charging system. As shown in FIG. 1, the wireless charging system includes a wireless power transmitter 100 and one or more wireless power receivers 110-1, 110-2, . . . , and 110-n.

The wireless power transmitter 100 may wirelessly transmit power 1-1, 1-2, . . . , and 1-n to the one or more wireless power receivers 110-1, 110-2, . . . , and 110-n, respectively. Particularly, the wireless power transmitter 100 may wirelessly transmit power 1-1, 1-2, . . . , and 1-n to only a wireless power receiver which is authenticated through a predetermined authentication procedure.

The wireless power transmitter 100 may achieve an electrical connection with the wireless power receivers 110-1, 110-2, . . . , and 110-n. For example, the wireless power transmitter 100 may transmit wireless electrical power in the form of electromagnetic waves to the wireless power receivers 110-1, 110-2, . . . , and 110-n. Here, the wireless power transmitter 100 may transmit the wireless power based on an induction scheme or a resonance scheme.

Meanwhile, the wireless power transmitter 100 may perform bidirectional communication with the wireless power receivers 110-1, 110-2, . . . , and 110-n. Here, the wireless power transmitter 100 and the wireless power receivers 110-1, 110-2, . . . , and 110-n may process or transmit/receive packets 2-1, 2-2, . . . , and 2-n which are configured by a predetermined packet, respectively. Particularly, the wireless electrical power receiver may be implemented as a mobile communication terminal, a PDA, a PMP, a smart phone or the like.

The wireless power transmitter 100 may wirelessly provide electrical power to a plurality of wireless power receivers 110-1, 110-2, . . . , and 110-n. For example, the wireless power transmitter 100 may transmit electrical power to the plurality of wireless power receivers 110-1, 110-2, . . . , and 110-n through a resonant scheme. When a wireless power transmitter 100 adopts the resonance scheme, an operable distance between the wireless power transmitter 100 and the plurality of wireless power receivers 110-1, 110-2, 1110-n may be within an indoor environment. Further, when the wireless power transmitter 100 adopts an electromagnetic induction scheme, it is preferable that a distance between the wireless power transmitter 100 and the plurality of wireless power receivers 110-1, 110-2, . . . , and 110-n is equal to or shorter than 10 cm.

The wireless power receivers 110-1, 110-2, . . . , and 110-n may receive wireless power from the wireless power transmitter 100 to charge batteries therein. Further, the wireless power receivers 110-1, 110-2, . . . , and 110-n may transmit a signal of requesting a wireless power transmission, information necessary for a reception of wireless electrical power, information on a status of the wireless power receiver, or information on a control of the wireless power transmitter 100 to the wireless power transmitter 100.

Further, the wireless power receivers 110-1, 110-2, . . . , and 110-n may transmit a message indicating a charging state of each of the wireless power receivers 110-1, 110-2, . . . , and 110-n to the wireless power transmitter 100.

The wireless power receivers 110-1, 110-2, . . . , and 110-n may include a display means, such as a display, and display a state of each of the wireless power receivers 110-1, 110-2, . . . , and 110-n based on the message received from each of the wireless power receivers 110-1, 110-2, . . . , and 110-n. Also, the wireless power transmitter 100 may display an expected time period until the charging of each of the wireless power receivers 110-1, 110-2 and 1110-n is completed, together with the state of each of the wireless power receivers 110-1, 110-2 and 1110-n.

The wireless power transmitter 100 may transmit a control signal for disabling a wireless charging function to each of the wireless power receivers 110-1, 110-2, . . . , and 110-n. The wireless power receivers 110-1, 110-2, . . . , and 110-n having received the disable control signal of the wireless charging function from the wireless power transmitter 100 may disable the wireless charging function.

Figure 2:
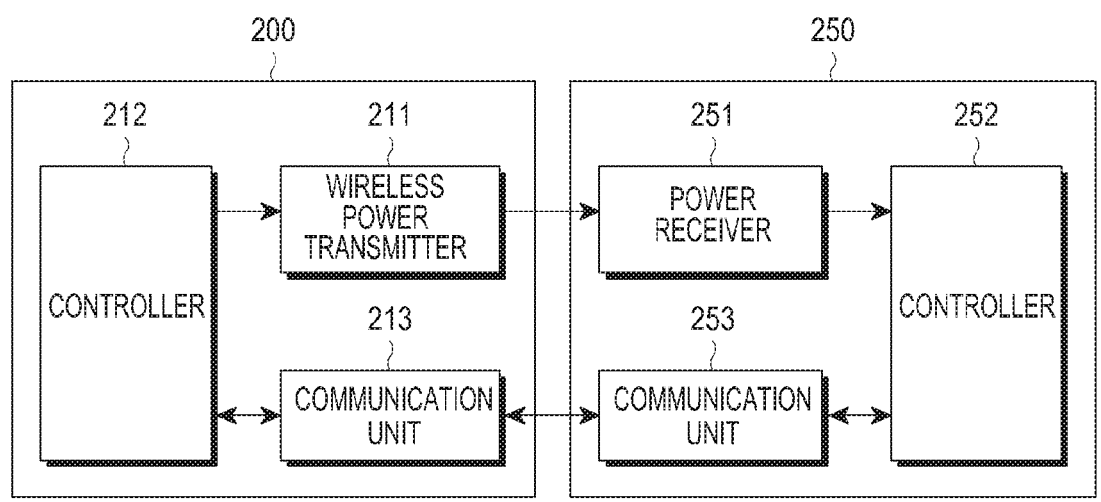
FIG. 2 is a block diagram illustrating a wireless power transmitter and a wireless power receiver according to an embodiment of the present disclosure.

FIG. 2 is a block diagram illustrating a wireless power transmission unit 200 (similar to the wireless power transmitter 100 of FIG. 1) and a wireless power receiving unit 250 (similar to the wireless power receivers 110-1, 110-2, . . . , and 110-n) according to an embodiment of the present disclosure.

As illustrated in FIG. 2, the wireless power transmission unit 200 may include a wireless power transmitter 211, a controller 212, and a communication unit 213. Further, the wireless power receiving unit 250 may include a power receiver 251, a controller 252, and a communication unit 253.

The wireless power transmitter 211 may supply power which is required by the wireless power transmission unit 200, and wirelessly provide power to the wireless power receiving unit 250. Here, the wireless power transmitter 211 may provide the electrical power in the form of alternating current (AC) waves, and also may supply electrical power in the form of direct current (DC) waves. Furthermore, the wireless power transmitter 211 may convert the direct current waves into the alternating current waves by using an inverter (not shown) so as to provide the electrical power in the form of alternating current waves. The wireless power transmitter 211 may be implemented in the form of an embedded battery or in the form of a power receiving interface so as to receive external power and to supply the power to the other components. It will be easily understood by those skilled in the art that the wireless power transmitter 211 is not limited if it can supply power of constant alternating current waves.

In addition, the wireless power transmitter 211 may supply the alternating current wave to the wireless power receiving unit 250. The wireless power transmitter 211 may further include a resonance circuit or an induction circuit, and thus may transmit or receive predetermined electromagnetic waves. When the wireless power transmitter 211 is implemented by the resonance circuit, inductance L of a loop coil of the resonance circuit may be changed. Meanwhile, it will be easily understood by those skilled in the art that the wireless power transmitter 211 is not limited as long as it can transmit and receive the electromagnetic waves.

The controller 212 may control overall operations of the wireless power transmission unit 200. The controller 212 or the controller 252 may control an overall operation of the wireless power transmission unit 200 by using an algorithm, a program, or an application which is required for a control and read from a storage unit (not shown). The controller 212 may be implemented in the form of a Central Processing Unit (CPU), a microprocessor, or a mini computer. The controller 252 may control overall operations of the wireless power transmission unit 200.

The communication unit 213 may communicate with the wireless power receiving unit 250 in a specific manner. The communication unit 213 may communicate with a communication unit 253 of the wireless power receiving unit 250 by using different communication schemes such as, for example, a Near Field Communication (NFC) scheme, a ZigBee communication scheme, an infrared ray communication scheme, a visible ray communication scheme, a Bluetooth communication scheme, a Bluetooth low energy scheme and the like. The communication unit 213 may use a Carrier sense multiple access (CSMA) and/or Collision Avoidance (CA) algorithm. On the other hand, the above-mentioned communication schemes are merely illustrated, and the scope of the present disclosure is not limited by a specific communication scheme which is performed by the communication unit 213.

Meanwhile, the communication unit 213 may transmit a signal for information of the wireless power transmission unit 200. Here, the communication unit 213 may either unicast, multicast, or broadcast the signal.

Further, the communication unit 213 may receive power information from the wireless power receiving unit 250. Here, the power information may include at least one of a capacity of the wireless power receiving unit 250, a residual amount of the battery, a number of times of charging, an amount of use, a battery capacity, and a proportion of the battery.

Further, the communication unit 213 may transmit a signal of controlling a charging function in order to control the charging function of the wireless power receiving unit 250. The signal of controlling the charging function may be a control signal of controlling the power receiver 251 of the wireless power receiving unit 250 so as to enable or disable the charging function.

The communication unit 213 may receive a signal from another wireless power transmitter (not shown) as well as the wireless power receiving unit 250. For example, the communication unit 213 may receive a Notice signal from another wireless power transmitter.

Meanwhile, although it is illustrated that the wireless power transmitter 211 and the communication unit 213 are configured as different hardware so that the wireless power transmission unit 200 communicates in an out-band manner, it is only an example. In the present disclosure, the wireless power transmitter 211 may be embedded in the communication unit 213 so that the wireless power transmission unit 200 may also communicate in an in-band manner.

The wireless power transmission unit 200 and the wireless power receiving unit 250 may transmit and receive various signals, and accordingly a process of joining the wireless power receiving unit 250 in the wireless power network that is managed by the wireless power transmission unit 200 and a process of charging through the wireless power transmission and reception can be performed.

The power receiver 251 may receive wireless power from the wireless power transmitter 211 based on the induction scheme or the resonance scheme.

Figure 3:
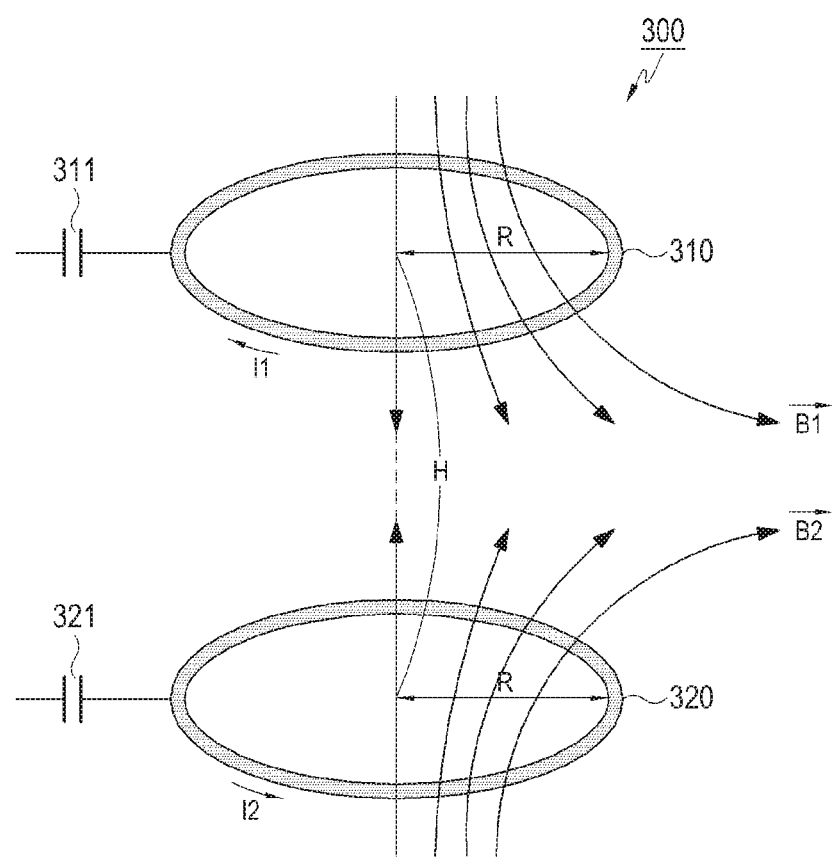
FIG. 3 illustrates a conceptual diagram of the power transmission unit according to various embodiments of the present disclosure.

FIG. 3 illustrates a conceptual diagram of a power transmission unit 300 (similar to the wireless power transmission unit 200 of FIG. 2) according to various embodiments of the present disclosure.

As shown in FIG. 3, the power transmission unit 300 may include a first coil 310 that is parallel with a second coil 320. The first coil 310 may have a circular shape of a radius R. The second coil 320 may have a circular shape of a radius R. Here, the first coil 310 and the second coil 320 may have the same shape. Meanwhile, in another embodiment, the first coil 310 and the second coil 320 may have different shapes. In the embodiment of FIG. 3, the first coil 310 and the second coil 320 may include coils wound up once, respectively, but the embodiment is merely exemplary of the disclosure, and the first coil 310 and the second coil 320 may include multiple winding coils.

The first coil 310 may be spaced apart from the second coil 320 by a distance of H. Here, H may be determined according to the power receiver 251 of the wireless power receiving unit 250 of FIG. 2. For example, the power receiver 251 of the wireless power receiving unit 250 may also include a coil. The length of one side of the coil of the power receiver 251 may be $h_1$, and in this case the wireless power transmitter 211 may determine the H as $h_1$. Meanwhile, the wireless power receiver may include the power reception unit in which the length of one side is $h_2$. For example, the power receiver 251 may be classified into different categories according to the received power or the power consumption. The power receiver 251 belonging to different categories may include different size(s) of coils. The wireless power transmitter 211 may receive category information from the power receiver 251, and in response to the category information, the distance between the first coil 310 and the second coil 320 may be adjusted. For example, if a length of one side of the second coil 320 of the power receiver 251 is determined to be $h_2$, the wireless power transmitter 211 may adjust the H to $h_2$. In this case, the wireless power transmitter 211 may further include a motor (not shown) capable of adjusting the distance between the first coil 310 and the second coil 320.

A capacitor 311 may be connected to the first coil 310. A capacitor 321 may be connected to the second coil 320. In FIG. 3, the capacitor 311 and the capacitor 321 are shown as single units, respectively, but this is merely exemplary, and various numbers of capacitors can be variously connected depending on a wireless power transmission scheme or impedance matching. This will be described later in more detail with reference to FIG. 8A to 8C or FIG. 9A to FIG. 9C.

When transmitting the wireless power, the wireless power transmitter may apply a first current I1 to the first coil 310 in a first direction. Although not shown, the wireless power transmitter may further include a power driving unit (not shown) capable of providing power and an inverter (not shown) for inverting DC power provided from the power driving unit (not shown) into AC power.

A magnetic field B1 may be formed around the first coil 310 by the first current I1 flowing in a first direction. The magnetic field B1 may be an induced magnetic field by the first current I1. The magnetic field B1 may have a lower direction at the center of the first coil 310. In addition, as shown in FIG. 3, at the lower part from the first coil 310, the magnetic field B1 may have a direction that is released to the outside.

When transmitting the wireless power, the wireless power transmitter 211 may apply a second current I2 to the second coil 320 in a second direction. Here, the second direction may be a direction opposite to the first direction. A magnetic field B2 may be formed around the second coil 320 by the second current I2 in a second direction. The magnetic field B2 may be an induced magnetic field by the second current. The magnetic field B2 may have an upper direction at the center of the second coil 320. In addition, as shown in FIG. 3, at the upper part from the second coil 320, the magnetic field B2 may have a direction that is released to the outside.

Accordingly, the magnetic fields B1 and B2 may be radially generated at a space between the first coil 310 and the second coil 320, and the power receiver 251 may receive power without a placement position limitation thereof. Meanwhile, the wireless power transmitter 211 including the first coil 310 and the second coil 320 may transmit power based on a resonance scheme or an induction scheme, and it will be described later in more detail.

Figure 4:
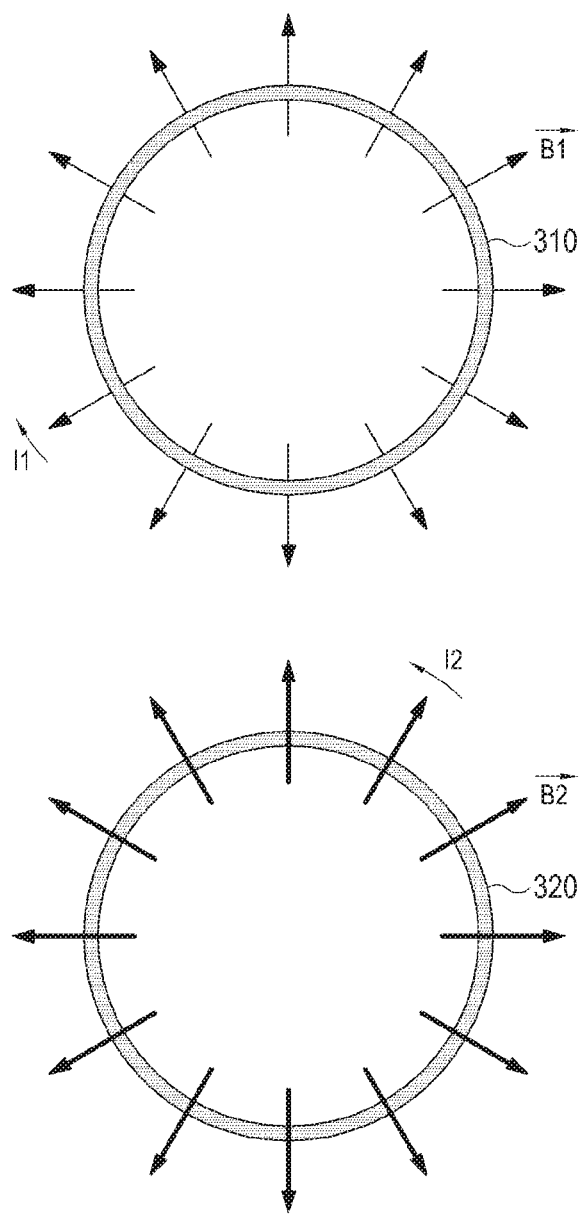
FIG. 4 is a plan view of a first coil and a second coil according to various embodiments of the present disclosure.

FIG. 4 shows a plan view of a first coil 310 and a second coil 320 according to various embodiments of the present disclosure. As shown in FIG. 4, a first current I1 flowing in a first direction may be applied to the first coil 310. Accordingly, the radial magnetic field B1 can be induced in a lower part of the first coil 310. In more detail, the magnetic field B1 may be formed radially from the center of the first coil 310 at the lower part in the vicinity of the first coil 310. The second current I2 flowing in a second direction may be applied to the second coil 320. The second direction may be a direction opposite to the first direction. Accordingly, the radial magnetic field B2 can be induced to the upper part of the second coil 320. In more detail, the magnetic field B2 may be formed radially from the center of the second coil 320 at the upper part in the vicinity of the second coil 320.

The wireless power receiving unit 250 may receive, even when placed anywhere outside the wireless power transmitter 211 between the first coil 310 and the second coil 320, power from the wireless power transmitter 211. As a result, the limitation on the placement position of the wireless power receiver can be resolved.

Figure 5A:
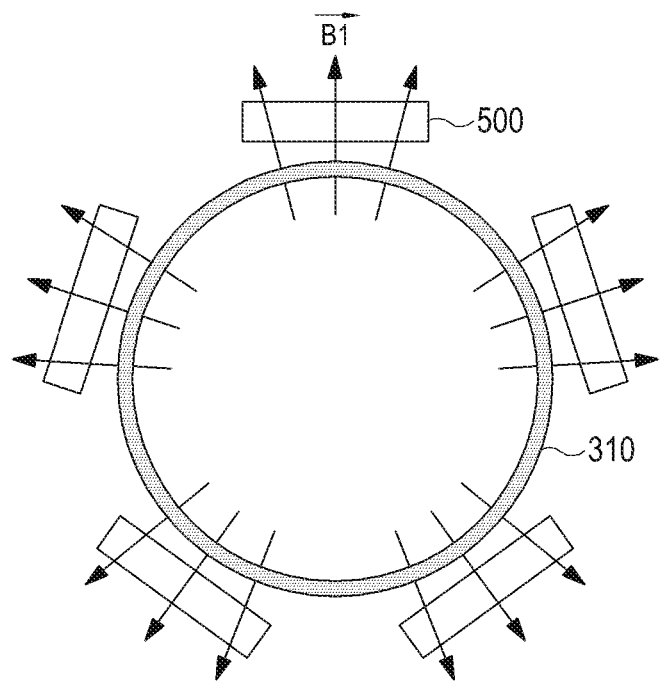
FIGS. 5A and 5B show a deployment of a wireless power receiver according to various embodiments of the present disclosure.
Figure 5B:
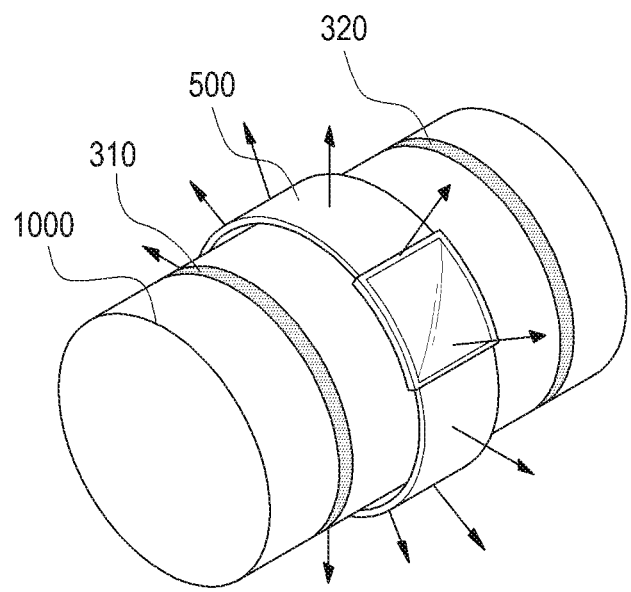

FIGS. 5A and 5B show a deployment of a wireless power receiver 500 according to various embodiments of the present disclosure. As shown in FIGS. 5A and 5B, the wireless power receiver 500 may be placed outside the wireless power transmitter between the first coil 310 and the second coil 320. In an embodiment, the wireless power receiver 500 may be a watch-type wearable electronic device. In addition, the wireless power transmitter is provided with the first coil 310 and the second coil 320 and may include a housing 1000 capable of mounting a watch-type wearable electronic device.

As shown in FIGS. 5A and 5B, the wireless power transmitter in accordance with various embodiments of the present disclosure may generate a radial magnetic field. Accordingly, even if the wireless power receiver 500 is placed at any position, the wireless power receiver 500 may wirelessly receive power based on the generated magnetic field.

Figure 6:
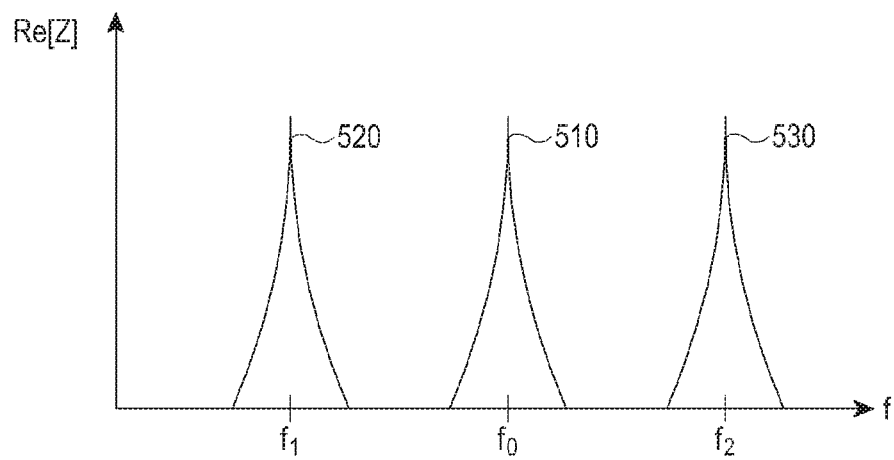
FIG. 6 is a graph for explaining a frequency design of a wireless power receiver according to various embodiments of the present disclosure.

FIG. 6 is a graph for explaining a frequency design of a wireless power receiver according to various embodiments of the present disclosure. The frequency in FIG. 6 may include, for example, the arrangement of the first coil 310 and the second coil 320, as shown in FIG. 3. When the first coil 310 is placed close to the second coil 320 are placed close, the first coil 310 and the second coil 320 may have a frequency of either an odd mode or an even mode. Here, the odd mode corresponds to a case where currents applied to the first coil 310 and the second coil 320 flow in opposite directions to each other, and the even mode corresponds to a case where currents applied to the first coil 310 and the second coil 320 flow in the same direction. In the embodiment of the present disclosure, currents applied to the first coil 310 may flow in a direction opposite to that of the second coil 320, and accordingly, the frequency of the odd mode can be determined. The frequency of the odd mode can be determined based on EQN. (1) below. The reactance of the first coil 310 and the second coil 320 may be $L_1$ and $L_2$, respectively. Meanwhile, the capacitor 311 or the capacitor 321 is connected to each of the first coil 310 and the second coil 320, and thereby assuming a case in which two resonators are formed. In addition, the wireless power transmitter may further include a resistor having a resistance value R.

$$\omega_{odd} = \text{imaginary part of } \left[ j\frac{\omega_1 + \omega_2}{2} - \frac{\Gamma_1 + \Gamma_2}{2} + j\sqrt{\left(\frac{\omega_1 - \omega_2}{2} - j\frac{\Gamma_1 - \Gamma_2}{2}\right)^2 + \left(\frac{\omega_1 + \omega_2}{4}\right)^2 k^2} \right] \quad \text{EQN. (1)}$$

In EQN. (1), angular frequency $\omega_1$ may be $2\eta f_1$, which is an angular frequency corresponding to a resonance frequency $f_1$ determined by the first coil 310 and the capacitor 311. Angular frequency $\omega_2$ may be $2\pi f_2$, which is an angular frequency corresponding to a resonance frequency $f_2$ determined by the second coil 320 and the capacitor 321. In addition, $\Gamma_1$ may be $$\frac{\omega_1}{2Q1},$$

and $\Gamma_2$ may be $$\frac{\omega_2}{2Q2}.$$

Further, Q1 may be $$\frac{\omega_1 L_1}{R},$$

Q2 may be $$\frac{\omega_2 L_2}{R}.$$

Meanwhile, k may be $$\frac{M}{\sqrt{L_1 L_2}},$$

M may be a mutual inductance coefficient between the first coil 310 and the second coil 320.

Meanwhile, when Q is a number relatively larger than 1, the frequency in the odd mode may be represented by EQN. (2) as follows:

$$\omega_{odd}|_{Q \gg 1} = \frac{\omega_1 + \omega_2}{2} + j\sqrt{\left(\frac{\omega_1 - \omega_2}{2}\right)^2 + \left(\frac{\omega_1 + \omega_2}{4}\right)^2 k^2} \quad \text{EQN. (2)}$$

The wireless power transmitter may have element values of the first coil 310 and the second coil 320, the capacitor 311 and the capacitor 321, and a resistor such that a frequency in the odd mode is 6.78 MHz as defined in the resonance scheme. In another embodiment, the wireless power transmitter may have element values of the first coil 310 and the second coil 320, the capacitor 311 and the capacitor 321, and a resistor such that a frequency in the odd mode is 100 kHz to 200 kHz as defined in the induction scheme.

Meanwhile, in the even mode, the wireless power transmitter may have a frequency defined by EQN. (3) as follows:

$$\omega_{even} = \text{imaginary part of } \left[ j\frac{\omega_1 + \omega_2}{2} - \frac{\Gamma_1 + \Gamma_2}{2} - j\sqrt{\left(\frac{\omega_1 - \omega_2}{2} - j\frac{\Gamma_1 - \Gamma_2}{2}\right)^2 + \left(\frac{\omega_1 + \omega_2}{4}\right)^2 k^2} \right] \quad \text{EQN. (3)}$$

A resonance frequency corresponding to an angular frequency, $\omega_{odd}$, in the odd mode may be $f_1$ 520 as shown in FIG. 6. A resonance frequency corresponding to an angular frequency, $\omega_{even}$, in the even mode may be $f_2$ 530 as shown in FIG. 6. Meanwhile, $f_0$ 510 may be a resonance frequency corresponding to the first coil 310 and the capacitor 311. For example, the resonance frequency $f_1$ in the odd mode may be smaller than $f_0$, and the resonance frequency $f_2$ in the even mode may be greater than $f_0$.

Figure 7:
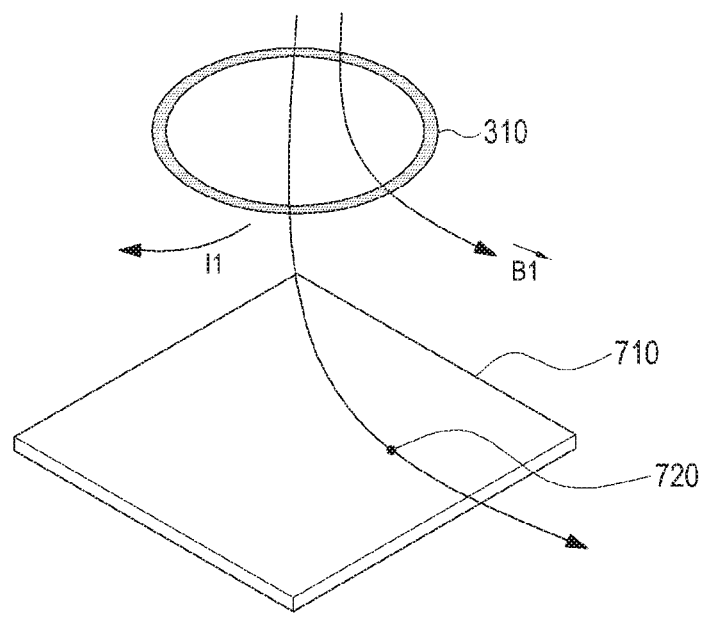
FIG. 7 illustrates a conceptual diagram of a wireless power transmitter according to various embodiments of the present disclosure.

FIG. 7 illustrates a conceptual diagram of a wireless power transmitter according to various embodiments of the present disclosure.

As shown in FIG. 7, the wireless power transmitter may include a first coil 310 and a shielding member 710.

A current I1 may be applied to the first coil 310 in the first direction. The wireless power transmitter may invert a direct current from the driving unit and apply the inverted current to the first coil 310. The first coil 310 may generate a magnetic field B1 on the basis of the applied current I1. In more detail, the radial magnetic field B1 can be induced in the lower part of the first coil 310. In more detail, the magnetic field B1 may be formed radially from the center of the first coil 310 at the lower part in the vicinity of the first coil 310.

The shielding member 710 may include a material capable of shielding a magnetic field. Thus, at first point 720 of the shielding member 710, the magnetic field B1 may not be transmitted through the shielding member 710. The traveling direction of the magnetic field B1 in the first point 720 may be changed to the outside. In more detail, when the magnetic field B1 is represented as a vector, the direction of the vector may be changed at the first point 720. Accordingly, the magnetic field B1 may be radially proceed at the lower part of the first coil 310.

In FIG. 7, although the shielding member 710 is shown as a plate form, which is merely exemplary, those skilled in the art will readily understand that there is no limitation to the form as long as the traveling direction of the magnetic field B1 from the first coil 310 can be changed in a radial shape. In addition, in FIG. 7, although the shielding member 710 is shown as being positioned at the lower part of the first coil 310, which is also only exemplary, the shielding member may be disposed at the upper part of the first coil 310. In this case, the direction of current applied to the first coil 310 may be opposite to FIG. 7.

The wireless power receiver may receive power from the wireless power transmitter, even when placed anywhere outside the wireless power transmitter between the first coil 310 and the second coil 320. As a result, the limitation on the placement position of the wireless power receiver can be resolved.

Figure 8A:
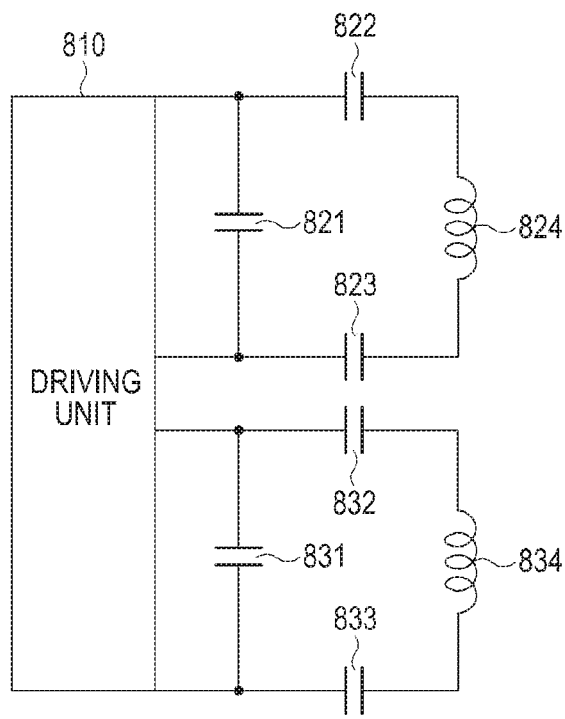
FIGS. 8A, 8B, and 8C are circuit diagrams of a power transmission unit according to various embodiments of the present disclosure.
Figure 8B:
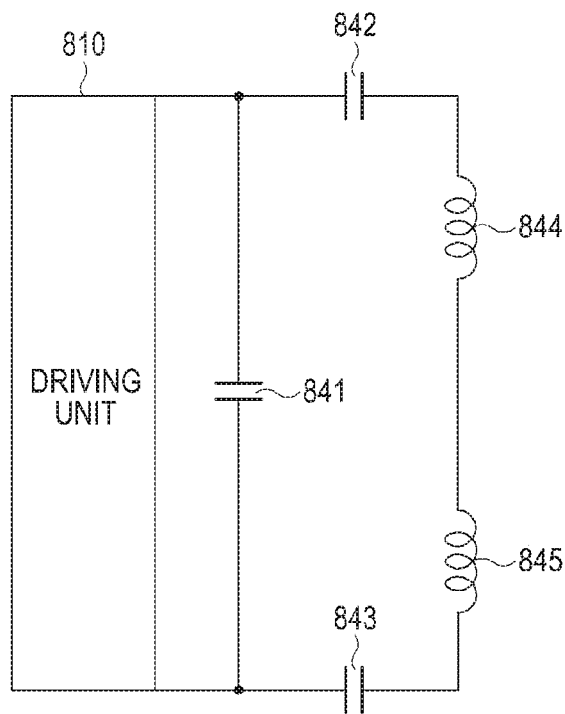
Figure 8C:
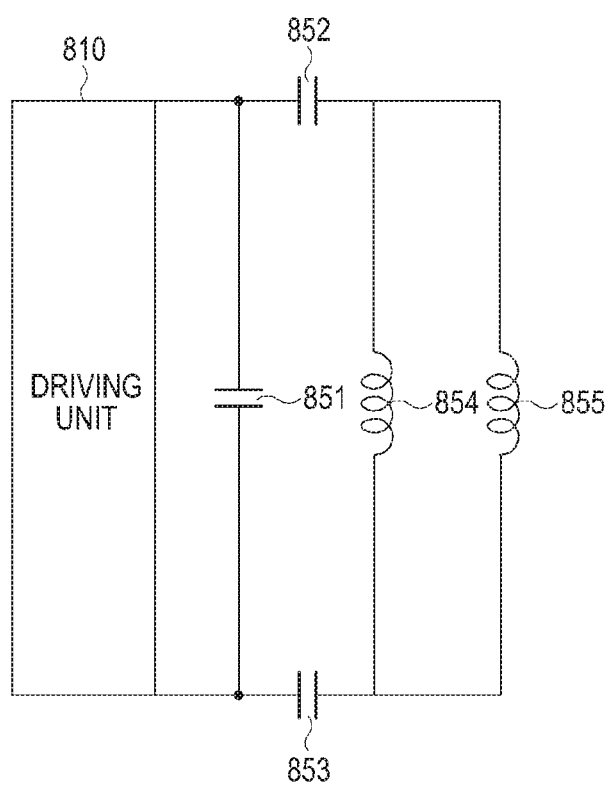

FIGS. 8A to 8C are circuit diagrams of a power transmission unit according to various embodiments of the present disclosure. FIGS. 8A to 8C may be, for example, circuit diagrams of a power transmission unit according to an induction scheme.

The power transmission unit according to FIGS. 8A to 8C may transmit the wireless power of the first frequency. The first frequency may be, for example, 100 kHz to 200 kHz. The power transmission unit may include at least one capacitor and at least one coil in order to efficiently transmit the wireless power of the first frequency. The capacitance and the inductance of each of at least one capacitor and at least one coil included in the power transmission unit may be determined corresponding to the first frequency. In more detail, the capacitance and the inductance may be determined such that a frequency in the odd mode based on the coil and the capacitor included in the power transmission unit becomes the first frequency. Meanwhile, although not shown, the power transmission unit may further include a matching element which may perform impedance matching. This is, for a high power output or high-efficiency power transmission.

Referring to FIG. 8A, a driving unit 810 may provide power for wireless transmission. Meanwhile, as mentioned above, the wireless power transmitter may further include an inverting unit (not shown) for inverting a direct current input from the driving unit 810 and outputting the inverted current. One end and the other end of a first capacitor 821 may be connected to the driving unit 810. One end of a second capacitor 822 may be connected to one end of the first capacitor 821, and the other end of the second capacitor 822 may be connected to one end of a first coil 824. The other end of the first coil 824 may be connected to the other end of a third capacitor 823. One end of the third capacitor 823 may be connected to one end of the first capacitor 821.

One end and the other end of a fourth capacitor 831 may be connected to the driving unit 810. One end of a fifth capacitor 832 may be connected to one end of the fourth capacitor 831, and the other end of the fifth capacitor 832 may be connected to one end of a second coil 834. The other end of a second coil 834 may be connected to the other end of a sixth capacitor 833. One end of the sixth capacitor 833 may be connected to one end of the fourth capacitor 831.

That is, in the embodiment of FIG. 8A, the first coil 824 may be connected to the first capacitor 821, the second capacitor 822, and third capacitor 823. In addition, the second coil 834 may be connected to the fourth capacitor 831, the fifth capacitor 832, and the sixth capacitor 833. In other words, the first coil and 824 the second coil 834 may include corresponding capacitors, respectively.

In an embodiment, the first coil 824 can be arranged parallel to the second coil 834 each other as shown in FIG. 3.

FIG. 8B shows an embodiment in which a first coil 844 and a second coil 845 are connected to a shared capacitor. Referring to FIG. 8B, a driving unit 810 may provide power for wireless transmission. Meanwhile, as mentioned above, the wireless power transmitter may further include an inverting unit (not shown) for inverting a direct current input from the driving unit 810 and outputting the inverted current. One end and the other end of a first capacitor 841 may be connected to the driving unit 810. One end of a second capacitor 842 may be connected to one end of the first capacitor 841, and the other end of the second capacitor 842 may be connected to one end of a first coil 844. The other end of the first coil 844 may be connected to one end of a second coil 845. The other end of the second coil 845 may be connected to the other end of a third capacitor 843. One end of the third capacitor 843 may be connected to one end of the first capacitor 841.

That is, in an embodiment of FIG. 8B, the first coil 844 and the second coil 845 may be connected to the first capacitor 841, the second capacitor 842, and the third capacitor 843. In other words, the first coil 844 and the second coil 845 may share capacitors, respectively.

In an embodiment, the first coil 844 may be connected in series with the second coil 845, and for example, as shown in FIG. 3, the first coil 844 can be arranged parallel to the second coil 845.

FIG. 8C shows an embodiment in which the first coil 854 and the second coil 855 are connected to a shared capacitor. Referring to FIG. 8C, a driving unit 810 may provide power for wireless transmission. Meanwhile, as mentioned above, the wireless power transmitter may further include an inverting unit (not shown) for inverting a direct current input from the driving unit 810 and outputting the inverted current. One end and the other end of a first capacitor 851 may be connected to the driving unit 810. One end of the second capacitor 852 may be connected to one end of the first capacitor 851, and the other end of the second capacitor 852 may be connected to one end of a first coil 854 and one end of a second coil 855. The other end of the first coil 854 may be connected to one end of a third capacitor 853. The other end of the second coil 855 may be connected to the other end of the third capacitor 853. One end of the third capacitor 853 may be connected to the other end of the first capacitor 851.

That is, in an embodiment of FIG. 8C, the first coil 854 and the second coil 855 may be connected to the first capacitor 851, the second capacitor 852, and the third capacitor 853. In other words, the first coil 854 and the second coil 855 may share capacitors, respectively.

In an embodiment, the first coil 854 may be connected in parallel with the second coil 855, for example, as shown in FIG. 3.

Figure 9A:
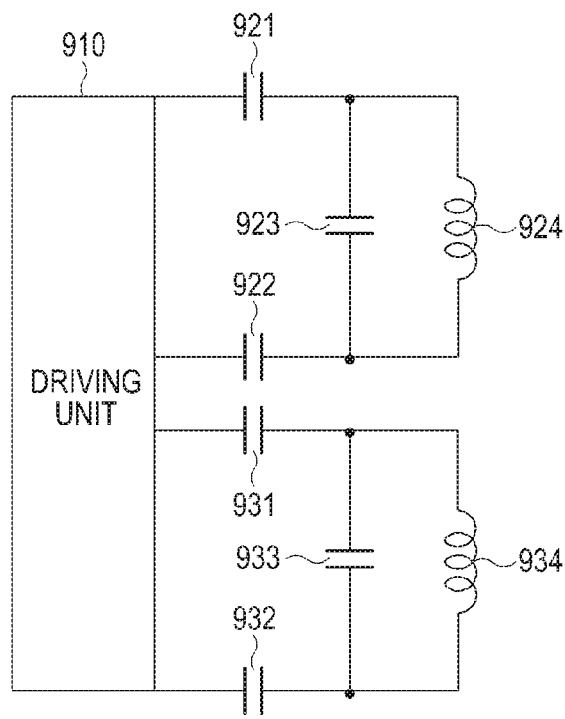
FIGS. 9A, 9B, and 9C are circuit diagrams of a power transmission unit according to various embodiments of the present disclosure.
Figure 9B:
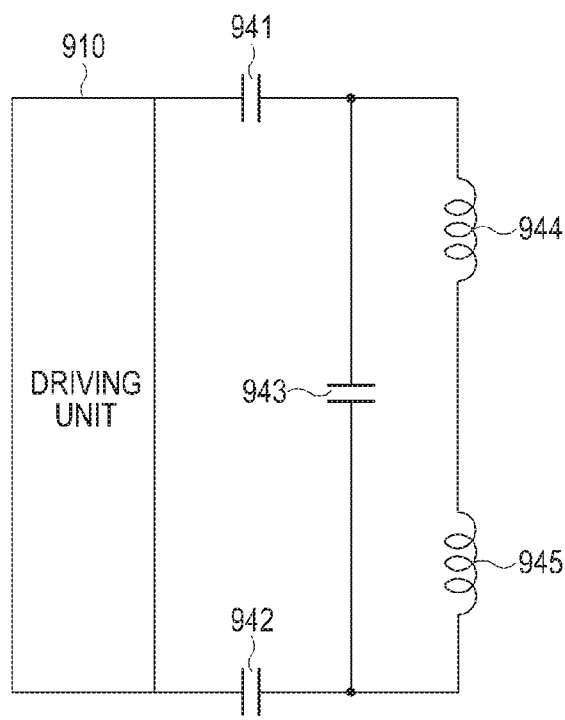
Figure 9C:
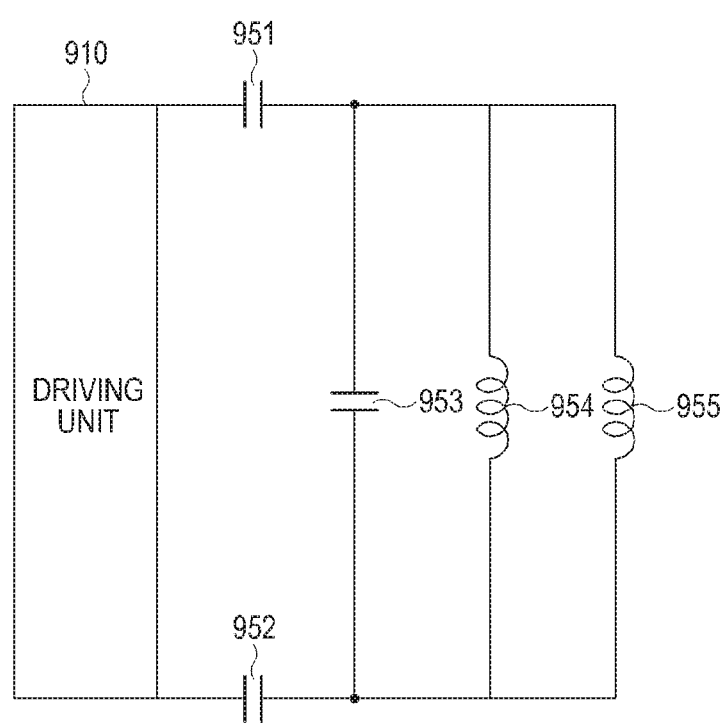

FIGS. 9A to 9C are circuit diagrams of a power transmission unit according to various embodiments of the present disclosure. FIGS. 9A to 9C may be circuit diagrams of a power transmission unit, for example, according to an induction scheme.

The power transmission unit according to FIGS. 9A to 9C may transmit the wireless power of a second frequency. The second frequency, for example, may be 6.79 MHz. The power transmission unit may include at least one capacitor and at least one coil in order to efficiently transmit the wireless power of a second frequency. The capacitance and the inductance of each of a capacitor and a coil included in the power transmission unit may be determined corresponding to the second frequency. More specifically, the capacitance and the inductance may be determined such that a frequency in the odd mode based on the coil and the capacitor included in the power transmission unit becomes a second frequency. Meanwhile, although not shown, the power transmission unit may further include a matching element which can perform impedance matching. This is for a high power output and high efficiency power transmission.

Referring to FIG. 9A, a driving unit 910 may provide power for wireless transmission. Meanwhile, as mentioned above, the wireless power transmitter may further include an inverting unit (not shown) for inverting a direct current input from the driving unit 910 and outputting the inverted current. One end of a first capacitor 921 may be connected to the driving unit 910. One end of a second capacitor 922 may be connected to the driving unit 910. One end of a third capacitor 923 may be connected to the other end of the first capacitor 921. The other end of the third capacitor 923 may be connected to the other end of the second capacitor 922. One end of a first coil 924 may be connected to the other end of the first capacitor 921 and one end of the third capacitor 923. The other end of the first coil 924 may be connected to the other end of the second capacitor 922 and the other end of the third capacitor 923.

One end of a fourth capacitor 931 may be connected to the driving unit 910. One end of a fifth capacitor 932 may be connected to the driving unit 910. One end of a sixth capacitor 933 may be connected to the other end of the fourth capacitor 931. The other end of the sixth capacitor 933 may be connected to the other end of the fifth capacitor 932. One end of a second coil 934 may be connected to the other end of the fourth capacitor 931 and one end of the sixth capacitor 933. The other end of the second coil 934 may be connected to the other end of the fifth capacitor 932 and the other end of the sixth capacitor 933.

That is, in the embodiment of FIG. 9A, the first coil 924 may be connected to the first capacitor 921, the second capacitor 922, and the third capacitor 923. In addition, the second coil 934 may be connected to the fourth capacitor 931, the fifth capacitor 932, and the sixth capacitor 933. In other words, the first coil 924 and the second coil 934 may include capacitors, respectively.

In an embodiment, the first coil 924 can be arranged parallel to the second coil 934 as shown in FIG. 3.

FIG. 9B shows an embodiment in which the first coil 944 and the second coil 945 are connected to a shared capacitor. Referring to FIG. 9B, the driving unit 910 may provide power for wireless transmission. Meanwhile, as mentioned above, the wireless power transmitter may further include an inverting unit (not shown) for inverting a direct current input from the driving unit 910 and outputting the inverted current.

One end of the first capacitor 941 may be connected to the driving unit 910. One end of the second capacitor 942 may be connected to the driving unit 910. One end of the third capacitor 943 may be connected to the other end of the first capacitor 941. The other end of the third capacitor 943 may be connected to the other end of the second capacitor 942. One end of a first coil 944 may be connected to the other end of the first capacitor 941 and one end of the third capacitor 943. The other end of the first coil 944 may be connected to one end of a second coil 945. The other end of the second coil 945 may be connected to the other end of the second capacitor 942 and the other end of the third capacitor 943.

That is, in an embodiment of FIG. 9B, the first coil 944 and the second coil 945 may be connected to the first capacitor 941, the second capacitor 942, and the third capacitor 943. In other words, the first coil 944 and the second coil 945 may share capacitors, respectively.

In an embodiment, the first coil 944 may be connected in series with the second coil 945, and for example, as shown in FIG. 3, the first coil 944 can be arranged parallel to the second coil 945.

FIG. 9C shows an embodiment in which the first coil 954 and the second coil 955 are connected to a shared capacitor. Referring to FIG. 9C, the driving unit 910 may provide power for wireless transmission. Meanwhile, as mentioned above, the wireless power transmitter may further include an inverting unit (not shown) for inverting a direct current input from the driving unit 910 and outputting the inverted current.

One end of a first capacitor 951 may be connected to the driving unit 910. One end of a second capacitor 952 may be connected to the driving unit 910. One end of a third capacitor 953 may be connected to the other end of the first capacitor 951. The other end of the third capacitor 953 may be connected to the other end of the second capacitor 952. One end of a first coil 954 may be connected to the other end of the first capacitor 951 and one end of the third capacitor 953. The other end of the first coil 954 may be connected to the other end of the second capacitor 952 and the other end of the third capacitor 953. One end of the second coil 955 may be connected to the other end of the first capacitor 951 and one end of the third capacitor 953. The other end of the second coil 955 may be connected to the other end of the second capacitor 952 and the other end of the third capacitor 923.

That is, in an embodiment of FIG. 9C, the first coil 954 and the second coil 955 may be connected to the first capacitor 941, the second capacitor 942, and the third capacitor 943. In other words, the first coil 954 and the second coil 955 may share capacitors, respectively.

In an embodiment, the first coil 954 may be connected in parallel with the second coil 955.

Figure 10A:
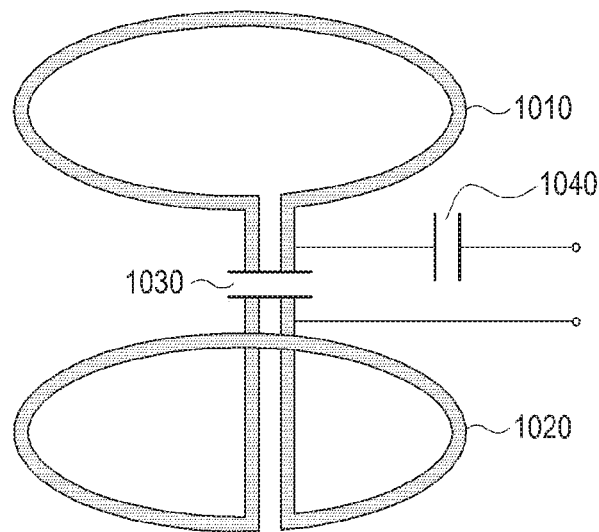
FIGS. 10A, 10B, and 10C are conceptual diagrams for explaining the connection between a coil and a capacitor according to various embodiments of the present disclosure.
Figure 10B:
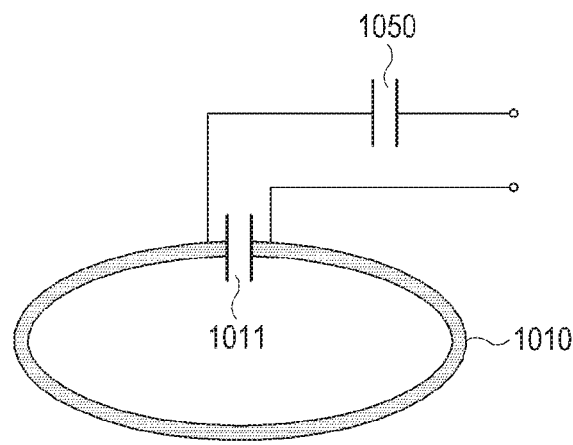
Figure 10B:
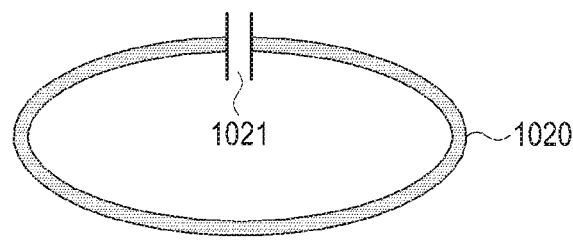
Figure 10C:
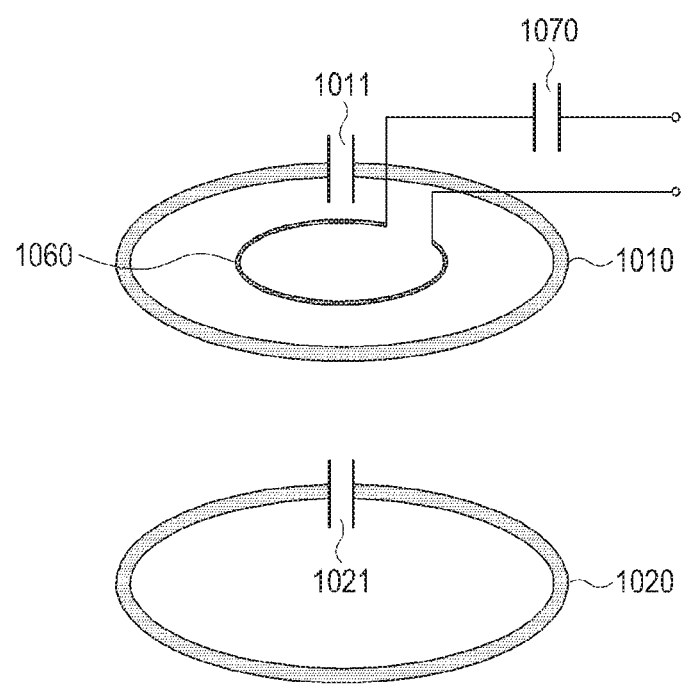

FIGS. 10A to 10C are conceptual diagrams for explaining connection between a coil and a capacitor according to various embodiments of the present disclosure.

Referring to FIG. 10A, a first coil 1010 may be arranged parallel to the second coil 1020 each other. The first coil 1010 and the second coil 1020 may be connected in series with.

The first coil 1010 the second coil 1020 may be connected to a capacitor 1030 in order to configure a resonance circuit. In one embodiment, the first coil 1010 and the second coil 1020 may share a capacitor 1030 in order to configure a resonance circuit. The first coil 1010 and the shared capacitor 1030 may be designed to have a resonance frequency, for example, $f_O$. In addition, the second coil 1020 and the shared capacitor 1030 may be designed to have a resonance frequency, for example, $f_O$. For example, the reactance of the first coil 1010 and the second coil 1020 may be the same, and the resonance frequency corresponding to the respective coils may be the same accordingly. However, this is merely exemplary, and the reactance of the first coil 1010 may also be different from the reactance of the second coil 1020.

Currents flowing in opposite directions can be applied to the first coil 1010 and the second coil 1020, and thus a full resonance frequency may have a frequency of the odd mode, for example, defined by EQN. (1). The reactance of the first coil 1010 and the second coil 1020 and the capacitance of the shared capacitor 1030 may be designed such that a frequency in the odd mode has a frequency defined by an induction scheme or a resonance scheme.

Meanwhile, an additional capacitor 1040 for feeding power from the driving unit (not shown) may be connected in parallel to the first coil 1010 and the second coil 1020.

Referring to FIG. 10B, the first coil 1010 may be arranged parallel to the second coil 1020. Thus, the first coil 1010 may be connected in parallel with the second coil 1020.

The first coil 1010 and the second coil 1020 may be connected to capacitors 1011 and 1021 in order to configure a resonance circuit. The first coil 1010 and the capacitor 1011 may be designed to have a resonance frequency, for example, $f_O$. In addition, the second coil 1020 and the capacitor 1021 may be designed to have a resonance frequency, for example, $f_O$. For example, the reactance of the first coil 1010 and the second coil 1020 may be the same, and resonant frequencies corresponding to the respective coils may be the same accordingly. However, this is merely exemplary, and the reactance of the first coil 1010 and the second coil 1020 may also be different from each other.

Currents flowing in opposite directions may be applied to the first coil 1010 and the second coil 1020, and thus a full resonance frequency, for example, may have a frequency of the odd mode defined by EQN. (1). The first coil 1010, the reactance of the second coil 1020, and the capacitance of the shared capacitor 103 can be designed such that a frequency in the odd mode has a frequency which is defined by an induction scheme or a resonance scheme.

Meanwhile, an additional capacitor 1050 for feeding power from the driving unit (not shown) may be connected in parallel to the first coil 1010.

When the first coil 1010 is connected in parallel to the second coil 1020, a current input to the first coil 1010 may be applied to the second coil 1020. When the first coil 1010 and the second coil 1020 are not connected to each other, an induced magnetic field and an induced electromotive force may flow in the second coil 1020 due to the magnetic field induced by the first coil 1010. When a current is applied to the first coil 1010 in the first direction, the induced electromotive force may flow to the second coil 1020 in the second direction opposite to the first direction. As a result, the frequency of the odd mode can be formed with respect to the first coil 1010 and the second coil 1020.

Referring to FIG. 10C, the first coil 1010 and the second coil 1020 may be arranged parallel to each other. The first coil 1010 and the second coil 1020 may be connected in parallel with each other or may not be connected to each other.

The first coil 1010 and the second coil 1020 may be connected to capacitors 1011 and 1021 in order to configure a resonance circuit, respectively. The first coil 1010 and the capacitor 1011 can be designed to have a resonance frequency, for example, $f_O$. In addition, the second coil 1020 and the capacitor 1021 may be designed to have a resonance frequency, for example, $f_O$. For example, the reactance of the first coil 1010 and the second coil 1020 may be the same, and resonant frequencies corresponding to the respective coils may be the same accordingly. However, this is merely exemplary, and the reactance of the first coil 1010 and the second coil 1020 may also be different from each other.

Currents flowing in opposite directions can be applied to the first coil 1010 and the second coil 1020, and thus a full resonance frequency, for example, may have a frequency of the odd mode defined by EQN. (1). The reactance of the first coil 1010 and the second coil 1020 and the capacitance of the shared capacitor 1030 can be designed such that a frequency in the odd mode has a frequency defined by an induction scheme or a resonance scheme.

Meanwhile, the wireless power transmitter may include an additional coil 1060 and an additional capacitor 1070 for feeding power from a driving unit (not shown). The driving unit may apply a current to the additional coil 1060 and the additional capacitor 1070. The additional coil 1060 may generate a magnetic field on the basis of the applied current. Due to the magnetic field generated by the additional coil 1060, an induced magnetic field and an induced electromotive force can be formed in the first coil 1010.

When the first coil 1010 is connected in parallel to the second coil 1020, a current formed in the first coil 1010 can be applied to the second coil 1020. When the first coil 1010 and the second coil 1020 are not connected, the induced magnetic field and an induced electromotive force may also flow in the second coil 1020 based on the magnetic field induced by the first coil 1010. When a current is applied to the first coil 1010 in the first direction, an induced electromotive force may flow in the second coil 1020 in a second direction opposite to the first direction. As a result, the frequency of the odd mode can be formed with respect to the first coil 1010 and the second coil 1020.

Figure 11:
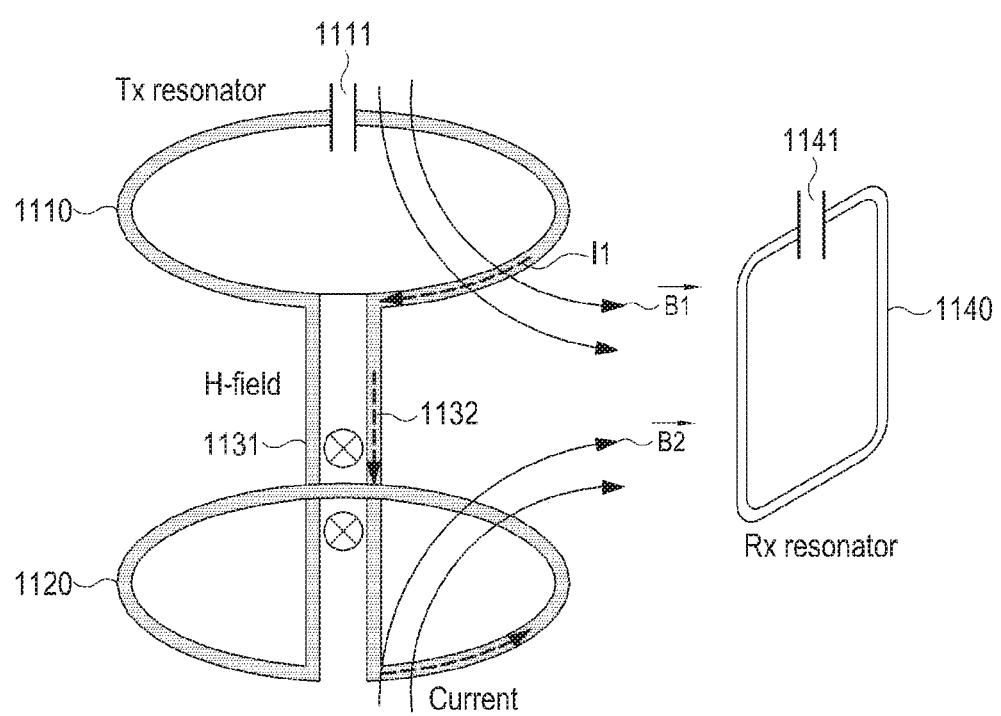
FIG. 11 illustrates a conceptual diagram of the power transmission unit according to various embodiments of the present disclosure.

FIG. 11 illustrates a conceptual diagram of a power transmission unit according to various embodiments of the present disclosure.

As shown in FIG. 11 the power transmission unit may include a loop including a first sub-loop 1110 and a second sub-loop 1120. Here, the first sub-loop 1110 has a substantially circular form, but may not be a closed loop. The second sub-loop 1120 also has a substantially circular form, but may not be a closed loop. The first sub-loop 1110 may be connected to the second sub-loop 1120. More particularly, connecting conductive wires 1131 and 1132 may be arranged between the first sub-loop 1110 and the second sub-loop 1120. The connecting conductive wires 1131 and 1132 may be arranged in a direction perpendicular to a plane that configures the loop of the first sub-loop 1110 and the second sub-loop 1120.

The driving unit (not shown) may apply a current I1 flowing in a first direction to the first sub-loop 1110. The current I1 may be applied along the connecting conductive wire 1131 to be applied to the second sub-loop 1120. The current I1 may be applied to the second sub-loop 1120 in a second direction opposite to the first direction. Thus, the first sub-loop 1110 and the second sub-loop 1120 may form the odd mode with each other.

The first sub-loop 1110 and the second sub-loop 1120 may be connected to the capacitor 1111. Accordingly, the first sub-loop 1110 and the capacitor 1111 may form a resonance circuit, and the second sub-loop 1120 and the capacitor 1111 may form a resonance circuit. Here, the resonance frequency of each of the resonance circuit corresponding to the first sub-loop 1110 and the resonance circuit corresponding to the second sub-loop 1120 may be $f_0$. In various embodiments, the resonance frequencies may be different from each other. Thus, the resonance frequency of the entire loop, for example, may have a resonance frequency of the odd mode as defined by EQN. (1).

In the embodiment of FIG. 11, the power transmission unit may transmit a wireless power based on an induction scheme or a resonant scheme, and the reactance of the first sub-loop 1110 and the second sub-loop 1120 and the capacitance of the capacitor 1111 can be designed such that the resonance frequency of the odd mode becomes 100 kHz to 200 kHz or 6.78 MHz.

As a result, a radial magnetic field can be generated in an area between the first sub-loop 1110 and the second sub-loop 1120 except for an area between connecting conductive wires 1131 and 1132. The wireless power receiver may include a power reception unit including a coil 1140 and a capacitor 1141. The wireless power receiver may wirelessly receive power when located in the remaining areas except the area between the connecting conductive wires 1131 and 1132.

Figure 12A:
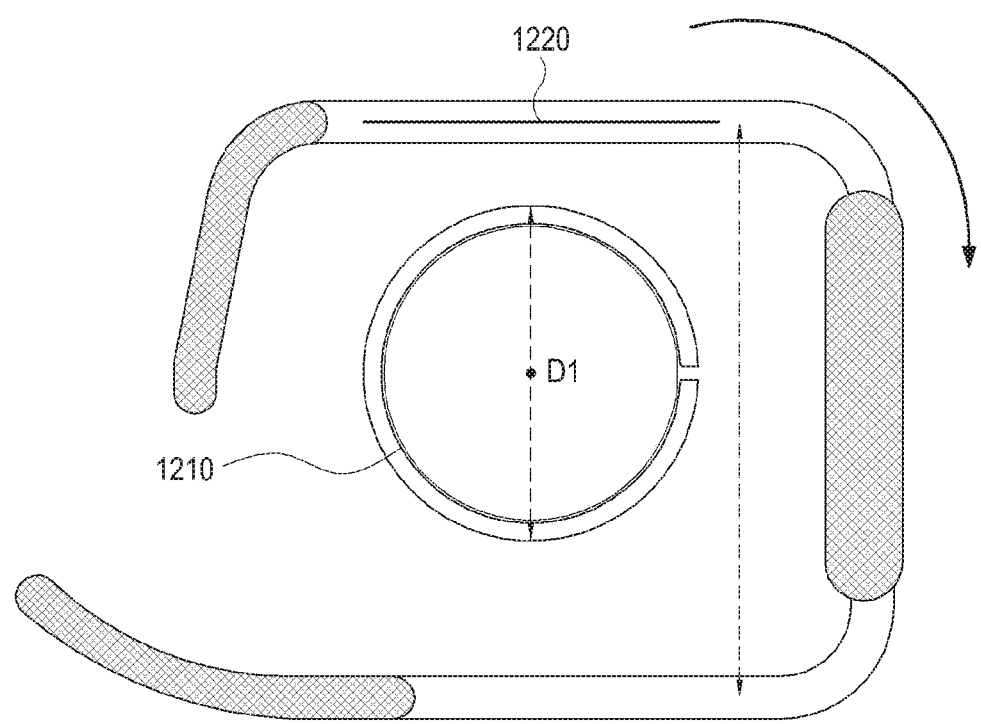
FIGS. 12A and 12B show a conceptual diagram and a graph illustrating a performance experiment, respectively, according to various embodiments of the present disclosure.
Figure 12B:
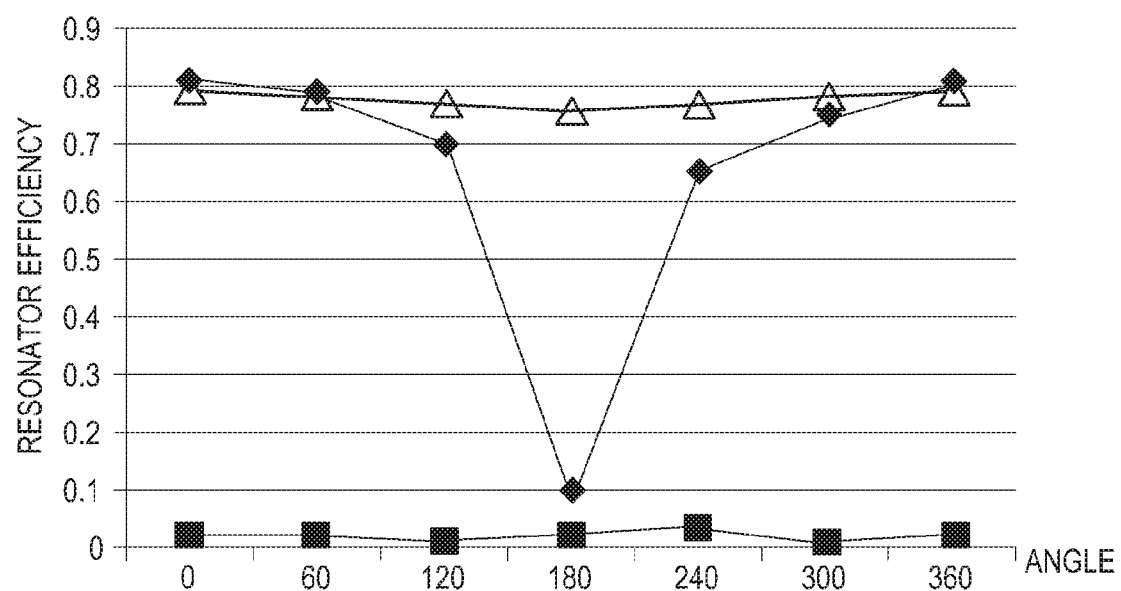

FIGS. 12A and 12B show a conceptual diagram and a graph illustrating a performance experiment, respectively, according to various embodiments of the present disclosure.

FIG. 12A illustrates a plan view of a power transmission unit according to various embodiments of the present disclosure. As shown in FIG. 12A, the power transmission unit may include a first coil 1210 with a diameter of D1. In addition, although not shown, the second coil 1220 may be disposed on the lower part of the first coil 1210. In FIG. 12A, a wireless power receiver may be disposed at first angle based on the first coil 1210. In addition, while rotating the arrangement position of the wireless power receiver around the power transmission unit, the charging efficiency for each position is shown in FIG. 12B.

Triangular shaped data of FIG. 12B indicates the angular-specific charging efficiency in the odd mode. Rectangular shaped data indicates the angular-specific charging efficiency in the even mode. The diamond shaped data indicates an angular-specific filling efficiency of a loop including two parallel sub-loops such as FIG. 11 in the wireless power transmitter.

As shown in FIG. 12B, it is possible to have a relatively high charging efficiency regardless of an arrangement angle of the wireless power receiver in the odd mode. In addition, it is possible to have a relatively low charging efficiency in the even mode. Meanwhile, the wireless power transmitter according to the embodiment of FIG. 11 may have a relatively high charging efficiency with respect to remaining angle layout except for a specific angle, that is, a position corresponding to the connecting conductive wire. According to various embodiments of the present disclosure, it can be identified that the limitation on the placement position of the wireless power receiver is reduced.

Figure 13:
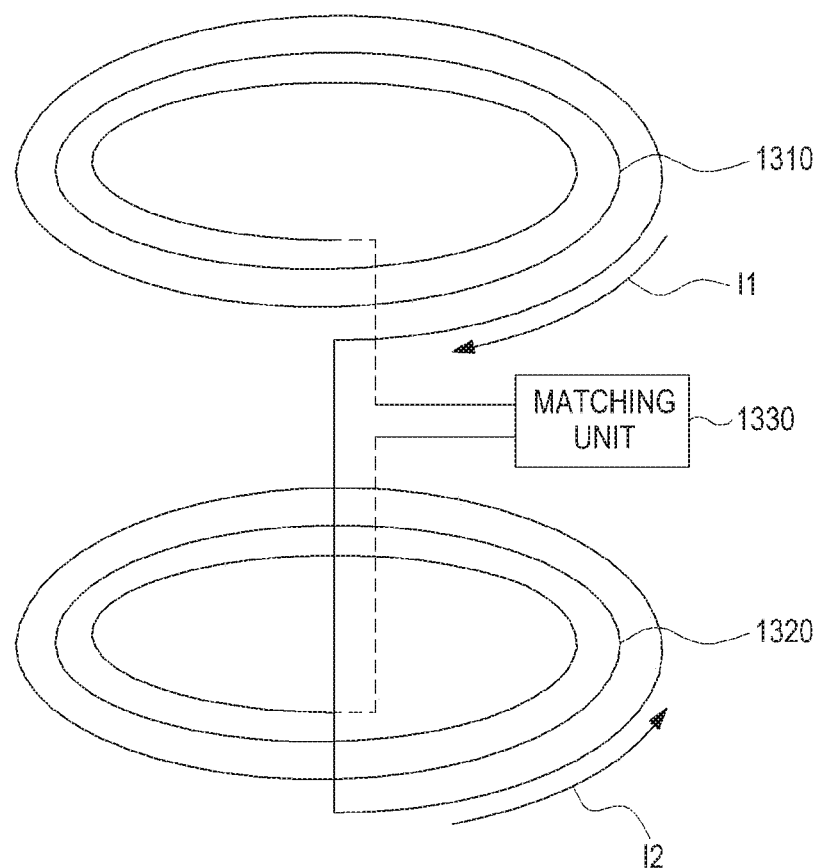
FIG. 13 illustrates a conceptual diagram of a power transmission unit according to various embodiments of the present disclosure.

FIG. 13 illustrates a conceptual diagram of a power transmission unit according to various embodiments of the present disclosure.

As shown in FIG. 13, the power transmission unit may include a first coil 1310 and a second coil 1320. The first coil 1310 may be arranged in parallel with the second coil 1320. A first current I1 flowing in a first direction may be applied to the first coil 1310 and a second current I2 flowing in the second direction may be applied to the second coil 1320. The first direction may be opposite to the second direction, and thereby the resonance circuit formed by the first coil 1310, the second coil 1320, and an additional capacitor may be the odd mode.

The first coil 1310 and the second coil 1320 may be wound multiple times and the first coil 1310 and the second coil 1320 may be implemented in a helical shape in another embodiment. A matching unit 1330 for impedance matching may also be connected to the first coil 1310 and the second coil 1320.

Figure 14:
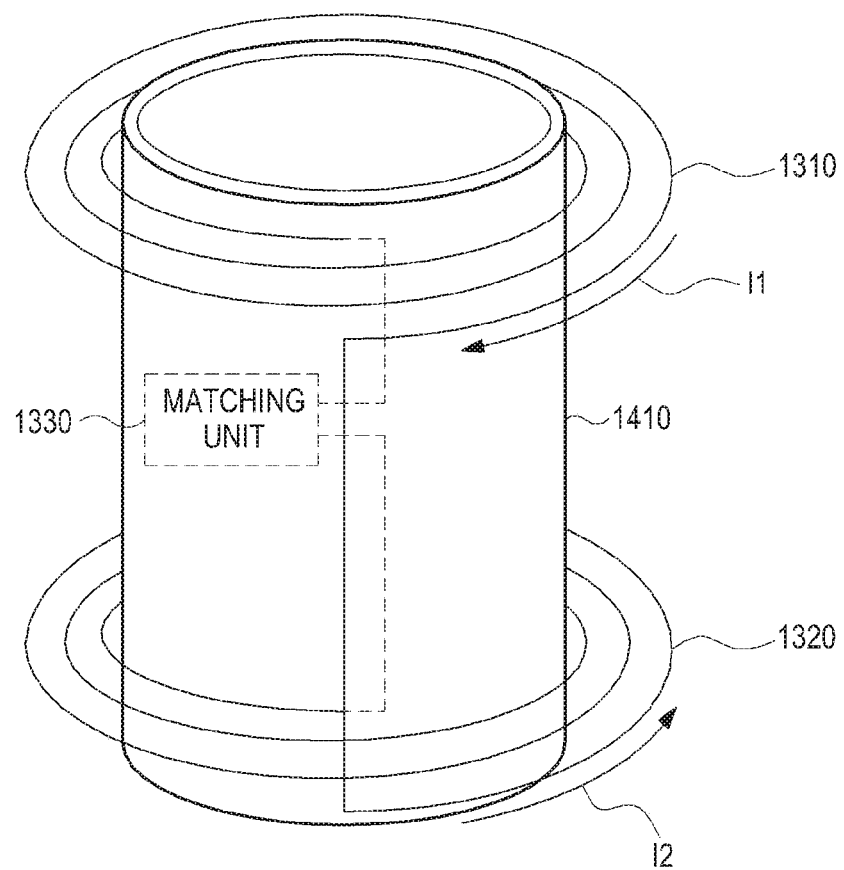
FIG. 14 illustrates a conceptual diagram of a power transmission unit according to various embodiments of the present disclosure.

FIG. 14 illustrates a conceptual diagram of a power transmission unit according to various embodiments of the present disclosure.

As shown in FIG. 14, the power transmission unit may include the first coil 1310 and the second coil 1320. The first coil 1310 may be connected in parallel with the second coil 1320. A shielding member 1410, which may be ferrite, may be disposed inside each of the first coil 1310 and the second coil 1320. In addition, the matching unit 1330 may be disposed inside the shielding member 1410. The shielding member 1410 may minimize the impact of a magnetic field generated from the first coil 1310 and the second coil 1320 on other elements such as the matching unit 1330.

Figure 15:
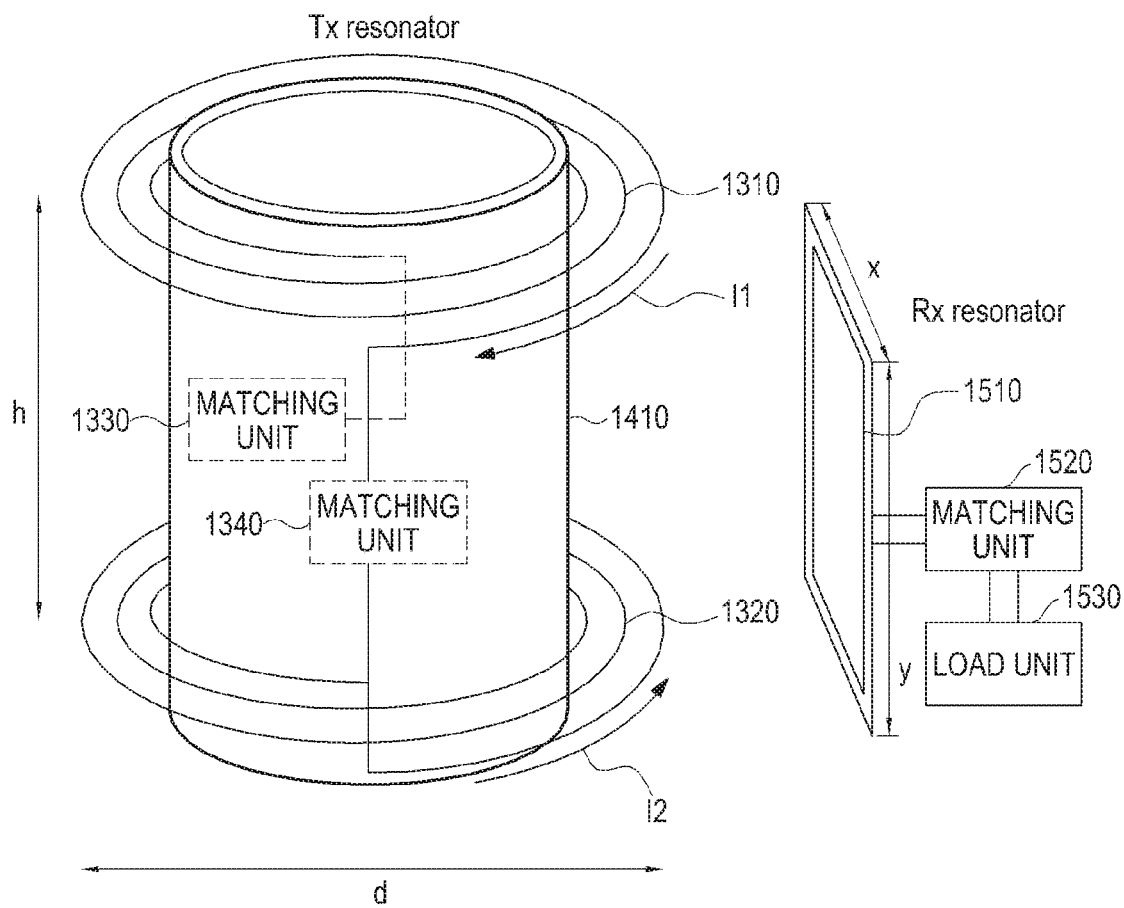
FIG. 15 is a conceptual diagram showing the relationship between a power transmission unit and a power reception unit according to various embodiments of the present disclosure.

FIG. 15 is a conceptual diagram showing the relationship between a power transmission unit and a power reception unit according to various embodiments of the present disclosure.

As shown in FIG. 15, the wireless power receiver may include a power reception unit 1510, a matching unit 1520, and a load unit 1530. The power reception unit 1510 may include a square shaped coil having the lengths of x and y of each of the sides. The power reception unit 1510 may further include other elements such as a capacitor in addition to the coil. The matching unit 1330 for impedance matching may be connected to the first coil 1310, and the matching unit 1340 for impedance matching may be connected to the second coil 1320.

The power transmission unit may include the first coil 1310 and the second coil 1320. The first coil 1310 may be disposed parallel to the second coil 1320. The first coil 1310 may be spaced apart from the second coil 1320 by a distance of H. Each of the first coil 1310 and the second coil 1320 may have a diameter of d.

Meanwhile, as described above, as the distance h between the first coil 1310 and the second coil 1320 is similar to the length y of one side of the coil of the wireless power receiver, the charging efficiency may be high. In addition, as the diameter d of the first coil 1310 and the second coil 1320 is similar to the length x of one side of the coil of the wireless power receiver, the charging efficiency may be high. For example, the diameter d can be produced by one-third to three times the length of x, and the distance h between the coils can be produced by one-third to three times the length of y.

Meanwhile, the lengths of both sides of the coil of the power reception unit 1510 may differ from each other depending on the category of the wireless power receiver. The wireless power transmitter may adjust the distance h between the first coil 1310 and the second coil 1320 based on the category information received from the wireless power receiver. The wireless power transmitter may adjust the distance h between the first coil 1310 and the second coil 1320 so as to correspond to the length y of the coil of the power reception unit 1510, by using length y information of the coil for each category.

Various embodiments of the present disclosure are to provide a wireless power transmitter for wirelessly transmitting power to a wireless power receiver. The wireless power transmitter may include: a driving unit that provides power; and a power transmission unit that wirelessly transmits power to the wireless power receiver based on the power received from the driving unit, wherein the power transmission unit may include at least one capacitor; a first coil connected to the at least one capacitor; and a second coil connected to the at least one capacitor and disposed parallel to the first coil.

In various embodiments of the present disclosure, a first current may be applied to the first coil in a first direction from the driving unit, and a second current may be applied to the second coil in a second direction from the driving unit.

In various embodiments of the present disclosure, the first coil may generate a first magnetic field based on the first current, and the second coil may generate a second magnetic field based on the second current.

In various embodiments of the present disclosure, a radial magnetic field may be formed between the first coil and the second coil based on the first magnetic field and the second magnetic field.

In various embodiments of the present disclosure, wherein the first direction and the second direction are opposite to each other, and the first coil, the second coil, and the at least one capacitor may have a resonance frequency of an odd mode.

In various embodiments of the present disclosure, the wireless power transmitter further includes at least one resistor, at least a part of the first coil and the at least one capacitor has a first resonance frequency, at least a part of the second coil and the at least one capacitor has a second resonance frequency, and the resonance frequency of the odd mode is determined by the following equation:

$$\omega_{odd} = \text{imaginary part of } \left[ j\frac{\omega_1 + \omega_2}{2} - \frac{\Gamma_1 + \Gamma_2}{2} + j\sqrt{\left(\frac{\omega_1 - \omega_2}{2} - j\frac{\Gamma_1 - \Gamma_2}{2}\right)^2 + \left(\frac{\omega_1 + \omega_2}{4}\right)^2 k^2} \right]$$

wherein $\omega_{odd}$ is the resonance frequency of the odd mode, $\omega_1$ is an angular frequency corresponding to the first resonance frequency, $\omega_2$ is an angular frequency corresponding to the second resonance frequency, $\Gamma_1$ is $$\frac{\omega_1}{2Q1},$$

$\Gamma_2$ is $$\frac{\omega_2}{2Q2},$$

Q1 is $$\frac{\omega_1 L_1}{R},$$

Q2 is $$\frac{\omega_2 L_2}{R},$$

k is $$\frac{M}{\sqrt{L_1 L_2}},$$

$L_1$ is a reactance of the first coil, $L_2$ is of a reactance of the second coil, M is a mutual inductance coefficient between the first coil and the second coil, and R is a resistance value of the at least one resistor.

In various embodiments of the present disclosure, $L_1$, $L_2$, M may have values when a resonance frequency of the odd mode is a frequency defined by an induction scheme or a frequency defined by a resonant scheme.

In various embodiments of the present disclosure, the first coil and the second coil may be connected in series or in parallel.

In various embodiments of the present disclosure, the first coil and the second coil may not be connected by wire. In this case, the second coil may generate an induced magnetic field and an induced electromotive force based on the magnetic field generated by the first coil after receiving power from the driving unit.

In various embodiments of the present disclosure, the first coil and a first capacitor among the one or more capacitors may form a resonance circuit, and the second coil and a second capacitor among the one or more capacitors may form a resonance circuit.

In various embodiments of the present disclosure, the first coil and the at least one capacitor may form a resonance circuit, and the second coil and the at least one capacitor may form a resonance circuit.

In various embodiments of the present disclosure, the wireless power transmission unit may wirelessly transmit the power based on an induction scheme or a resonant scheme.

In various embodiments of the present disclosure, the first coil and the second coil may be wound one time or multiple times.

In various embodiments of the present disclosure, the wireless power transmitter may further include a shielding member disposed inside the first coil and the second coil.

In various embodiments of the present disclosure, at least one of a size of the first coil and the second coil and a distance between the first coil and the second coil may be determined corresponding to the size of the coil of the wireless power receiver.

In various embodiment of the present disclosure, the wireless power transmitter may further include: a communication unit that receives category information of the wireless power receiver from a wireless power receiver; and a motor that adjusts the distance between the first coil and the second coil corresponding to the size of the coil of the wireless power receiver obtained from the category information.

In various embodiments of the present disclosure, a wireless power transmitter for wirelessly transmitting power to a wireless power receiver may include: a driving unit that provides power; and a power transmission unit that wirelessly transmits power to the wireless power receiver based on the power received from the driving unit, wherein the power transmission unit may include at least one capacitor; and a coil that is connected to the at least one capacitor and includes a first sub-coil, a second sub-coil disposed parallel to the first sub-coil, and a connecting conductive wire that connects the first sub-coil and the second sub-coil.

In various embodiments of the present disclosure, wherein the driving unit applies a current to the coil, and the coil may connect the first sub-coil and the second sub-coil such that a current is applied to the first sub-coil in a first direction and a current is applied to the second sub-coil in a second direction opposite to the first direction.

In various embodiments of the present disclosure, wherein the first coil may generate a first magnetic field based on a current flowing in the first direction, and the second coil may generate a second magnetic field based on a current flowing in the second direction.

In various embodiments of the present disclosure, a radial magnetic field may be formed between the first sub-coil and the second sub-coil based on the first magnetic field and the second magnetic field.

In various embodiments of the present disclosure, the first sub-coil, the second sub-coil, and the at least one capacitor may have resonance frequencies of the odd mode.

Each of the aforementioned elements of the wireless power transmitter may be configured by one or more components, and the name of the components may vary depending on the type of an electronic device. In various embodiments, the electronic device may include at least one of the above-described elements. Some of the above-described elements may be omitted from the electronic device, or the electronic device may further include additional elements. Further, some of the elements of the electronic device according to various embodiments of the present disclosure may be combined to form a single entity that performs the same functions as those of the corresponding elements prior to the combination.

The term "module" as used herein may, for example, mean a unit including one of hardware, software, and firmware or a combination of two or more of them. The "module" may be interchangeably used with, for example, the term "unit", "logic", "logical block", "component", or "circuit". The "unit" may be the smallest unit of an integrated component or a part thereof. The "unit" may be the smallest unit that performs one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

The module or programming module according to various embodiments of the present disclosure may include one or more of the aforementioned elements or may further include other additional elements, or some of the aforementioned elements may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

Various embodiments disclosed herein are provided merely to easily describe technical details of the present disclosure and to help the understanding of the present disclosure, and are not intended to limit the scope of the present disclosure. Therefore, it should be construed that all modifications and changes or modified and changed forms based on the technical idea of the present disclosure fall within the scope of the present disclosure.

What is claimed is:

1. A wireless power transmitter that wirelessly transmits power to a wireless power receiver, the wireless power transmitter comprising:
   a cylindrical housing,
   a power supply; and
   a power transmission unit that wirelessly transmits the power to the wireless power receiver based on a first power received from the power supply,
   wherein the power transmission unit comprises a first capacitor, a first coil connected to the first capacitor, a second capacitor, and a second coil connected to the second capacitor and physically disposed in parallel with the first coil,
   wherein the wireless power receiver is mountable on an outer surface of the cylindrical housing with a curvature corresponding to the outer surface of the cylindrical housing, and is positioned between the first coil and the second coil, and a diameter of the first coil corresponds to a diameter of the second coil,
   wherein a receiving coil of the wireless power receiver is oriented vertically with respect to the first coil and the second coil, and
   wherein a first portion of the cylindrical housing contacts the wireless power receiver while the wireless power receiver is mounted on the cylindrical housing, and the first portion of the cylindrical housing constitutes a circumference between the first coil and the second coil such that the first portion is parallel with the first coil and the second coil.

2. The wireless power transmitter of claim 1, wherein, a first current is applied to the first coil in a first direction by the power supply, and
a second current is applied to the second coil in a second direction by the power supply.

3. The wireless power transmitter of claim 2, wherein the first coil generates a first magnetic field based on the first current, and
the second coil generates a second magnetic field based on the second current.

4. The wireless power transmitter of claim 3, wherein a radial magnetic field is formed between the first coil and the second coil based on the first magnetic field and the second magnetic field.

5. The wireless power transmitter of claim 2, wherein the first direction and the second direction are opposite to each other, and
the first coil, the first capacitor, the second coil, and the second capacitor have a resonance frequency of an odd mode.

6. The wireless power transmitter of claim 5, further comprising a resistor,
wherein, the first coil and the first capacitor have a first resonance frequency,
the second coil and the second capacitor have a second resonance frequency, and
the resonance frequency of the odd mode is determined by:

$$\omega_{odd} = \text{imaginary part of}\left[j\frac{\omega_1+\omega_2}{2}-\frac{\Gamma_1+\Gamma_2}{2}+j\sqrt{\left(\frac{\omega_1-\omega_2}{2}-j\frac{\Gamma_1-\Gamma_2}{2}\right)^2+\left(\frac{\omega_1+\omega_2}{4}\right)^2 k^2}\right]$$

wherein ωodd is the resonance frequency of the odd mode,
ω1 is an angular frequency corresponding to the first resonance frequency,
ω2 is an angular frequency corresponding to the second resonance frequency,
Γ1 is $$\frac{\omega_1}{2Q1},$$

Γ2 is $$\frac{\omega_2}{2Q2},$$

Q1 is $$\frac{\omega_1 L_1}{R},$$

Q2 is $$\frac{\omega_2 L_2}{R},$$

k is $$\frac{M}{\sqrt{L_1 L_2}},$$

L1 is a reactance of the first coil,
L2 is a reactance of the second coil,
M is a mutual inductance coefficient between the first coil and the second coil, and
R is a resistance value of the resistor.

7. The wireless power transmitter of claim 6, wherein L1, L2, and M have values when the resonance frequency of the odd mode is a frequency defined by an induction scheme or a frequency defined by a resonance scheme.

8. The wireless power transmitter of claim 1, wherein the first coil and the second coil are connected in series or in parallel.

9. The wireless power transmitter of claim 1, wherein the first coil and the second coil are not connected by a wire.

10. The wireless power transmitter of claim 9, wherein the second coil generates an induced magnetic field and an induced electromotive force based on the induced magnetic field generated by the first coil after the first coil receives the first power from the power supply.

11. The wireless power transmitter of claim 1, wherein the first coil and the first capacitor form a first resonance circuit, and
the second coil and the second capacitor form a second resonance circuit.

12. The wireless power transmitter of claim 1, further comprising a shielding member disposed inside the first coil and the second coil.

13. The wireless power transmitter of claim 1, wherein at least one from among a size of the first coil, a size of the second coil, and a distance between the first coil and the second coil is determined corresponding to a size of a coil of the wireless power receiver.

14. The wireless power transmitter of claim 13, further comprising:
a communication circuit that receives category information of the wireless power receiver from the wireless power receiver; and
a motor that adjusts the distance between the first coil and the second coil corresponding to the size of the coil of the wireless power receiver obtained from the category information.

* * * * *